(12) United States Patent
Bubulka et al.

(10) Patent No.: US 8,544,961 B2
(45) Date of Patent: Oct. 1, 2013

(54) FABRICATED VEHICLE AXLE

(75) Inventors: John Stephen Bubulka, Westchester, IL (US); Ashley Thomas Dudding, Yorkville, IL (US); Jerome Lim Cortez, Tinley Park, IL (US); Brian Scott Wiltjer, Tinley Park, IL (US)

(73) Assignee: Hendrickson USA, L.L.C., Itasca, IL (US)

(*) Notice: Subject to any disclaimer, the term of this patent is extended or adjusted under 35 U.S.C. 154(b) by 387 days.

(21) Appl. No.: 12/874,982

(22) Filed: Sep. 2, 2010

(65) Prior Publication Data
US 2012/0056469 A1    Mar. 8, 2012

(51) Int. Cl.
*B60B 37/00*    (2006.01)
*B60B 35/00*    (2006.01)

(52) U.S. Cl.
USPC ....................................... 301/127; 301/124.1

(58) Field of Classification Search
USPC ............................... 301/124.1, 125, 127, 129
See application file for complete search history.

(56) References Cited

U.S. PATENT DOCUMENTS

| | | | |
|---|---|---|---|
| 1,690,511 A | 11/1928 | Urschel | |
| 1,784,856 A | 12/1930 | Urschel | |
| 1,823,158 A | 9/1931 | Mogford et al. | |
| 1,899,347 A | 2/1933 | Mogford et al. | |
| 2,148,714 A | 2/1939 | Urschel | |
| 3,804,467 A * | 4/1974 | Austermann | ............... 301/127 |
| 5,588,660 A | 12/1996 | Paddison | |
| 5,741,027 A | 4/1998 | Stroh | |
| 5,810,377 A | 9/1998 | Keeler et al. | |
| 5,865,452 A | 2/1999 | Chalin | |
| 6,394,473 B1 | 5/2002 | Platner | |
| 6,609,764 B2 | 8/2003 | Dudding et al. | |
| 6,799,811 B1 | 10/2004 | Dauber et al. | |
| 7,328,908 B2 | 2/2008 | Barber et al. | |
| 7,445,220 B2 | 11/2008 | von Mayenburg et al. | |
| 7,862,058 B2 * | 1/2011 | Bubulka et al. | ......... 280/93.512 |
| 2009/0230760 A1 | 9/2009 | Bubulka | |

FOREIGN PATENT DOCUMENTS

GB    289684 A    5/1928

OTHER PUBLICATIONS

International Search Report and Written Opinion for PCT Patent Application No. PCT/US2011/049078, dated Dec. 5, 2011.
ArvinMeritor RideStar RAL Front Air Suspension, 2003 Mid-America Trucking Show, circa 2003.
Hendrickson USA, L.L.C., Composolite FX—Fixed-axle suspension system, circa 2006.

* cited by examiner

*Primary Examiner* — Jason Bellinger
(74) *Attorney, Agent, or Firm* — Cook Alex Ltd.

(57) ABSTRACT

A fabricated vehicle axle is provided with a main body defined by the combination of a channel having an inverted U-shaped configuration and a bottom plate. The ends of the main body are curved upwardly to define a pair of gooseneck portions. Axle head sections are formed at the ends of the axle and are closed off by end extensions extending from the front and rear walls of the channel and a cover flap extension extending from the top wall of the channel. A head plate is inserted within the space between the cover flap and the top edges of the end extensions. King pin bolt holes are machined at each axle head section into the cover flaps, head plates and each end of the bottom plate to permit a king pin to be installed therein.

36 Claims, 15 Drawing Sheets

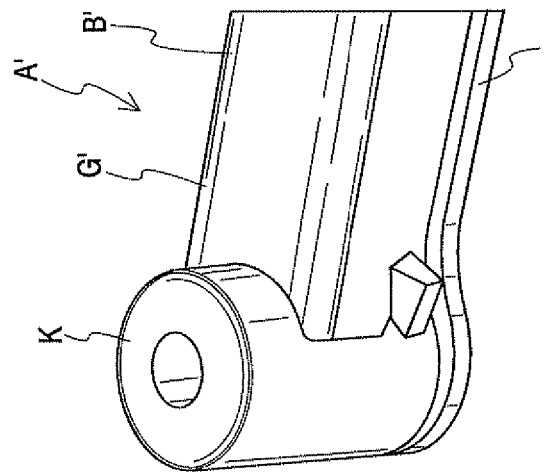
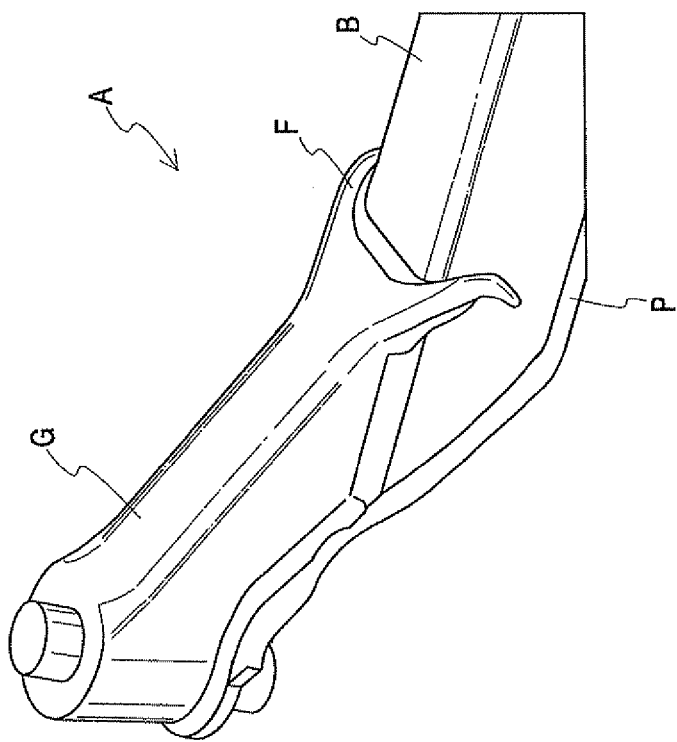
Fig. 1 PRIOR ART
Fig. 2 PRIOR ART

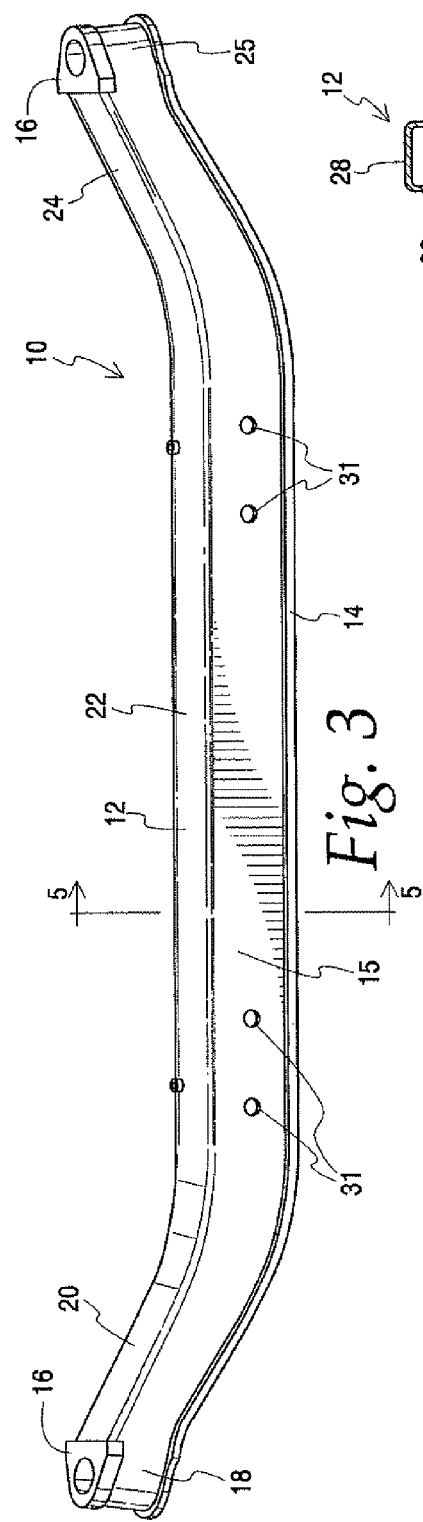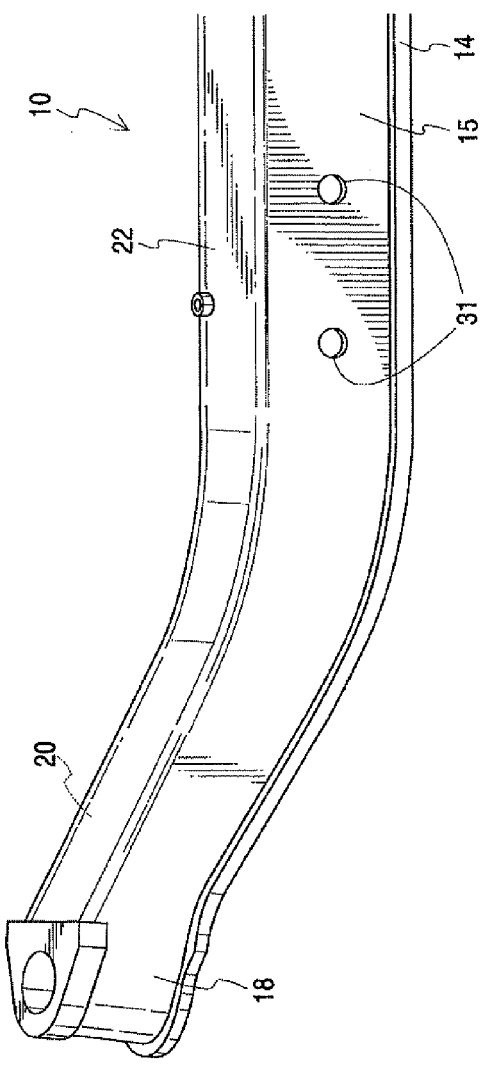

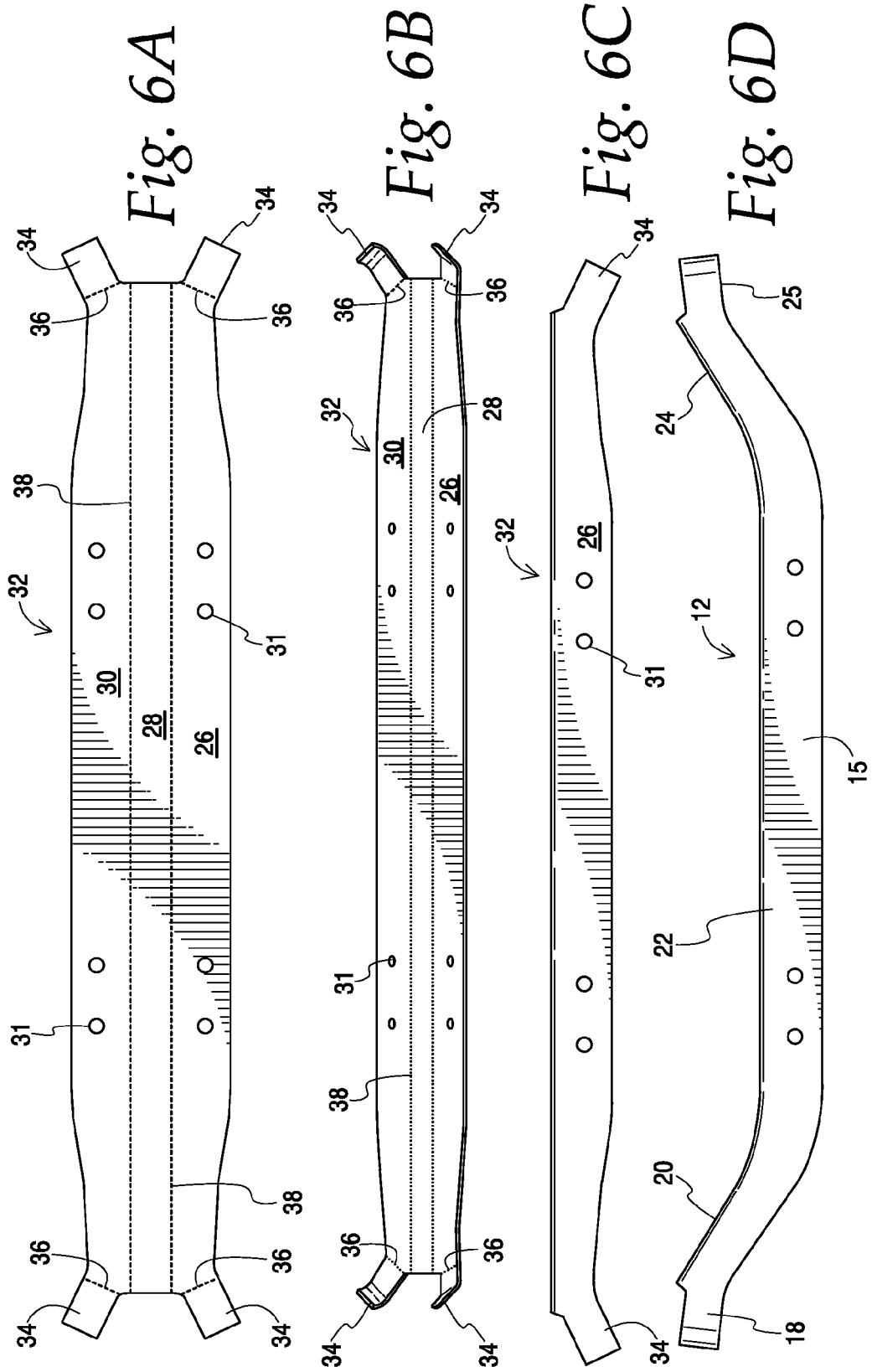

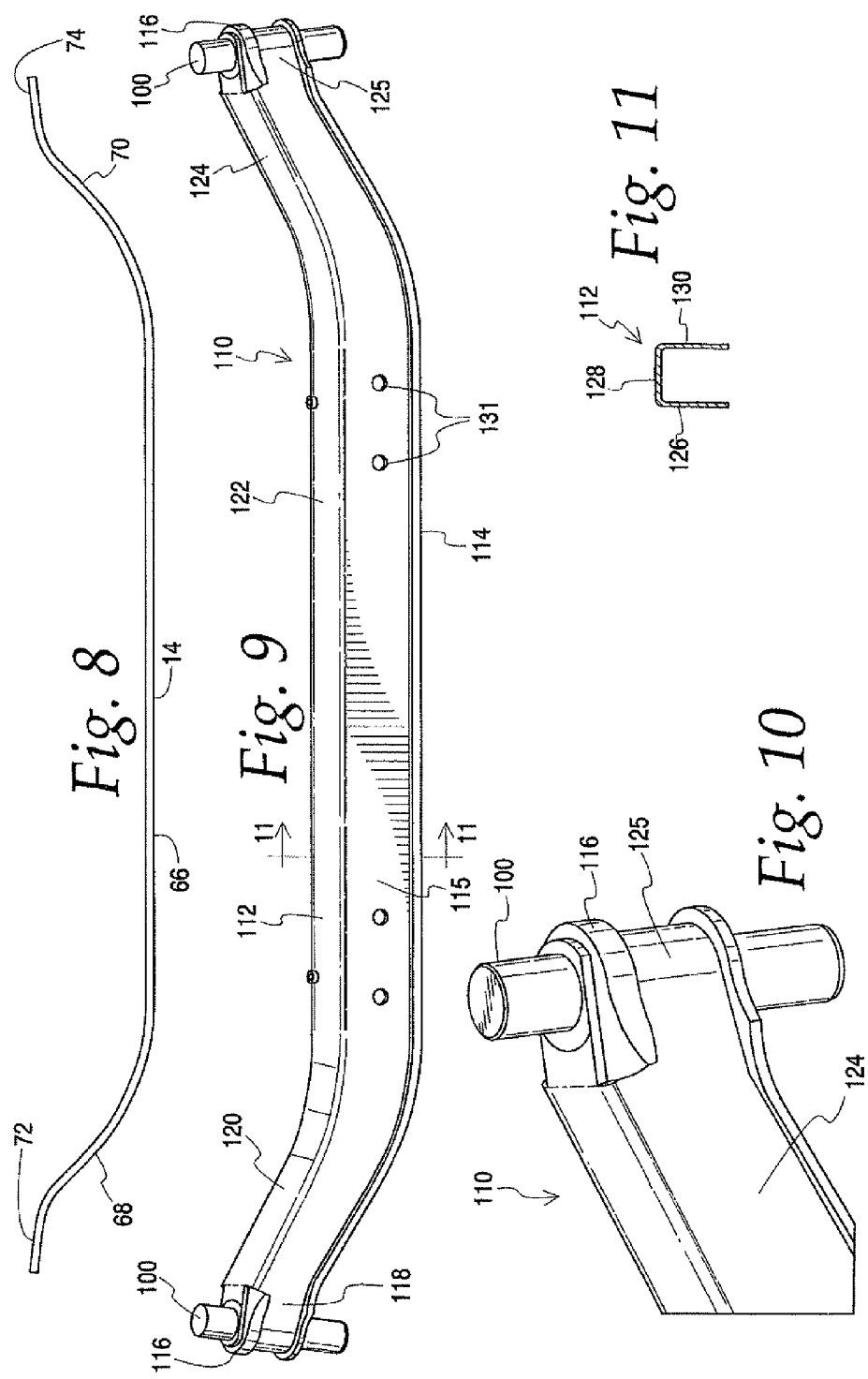

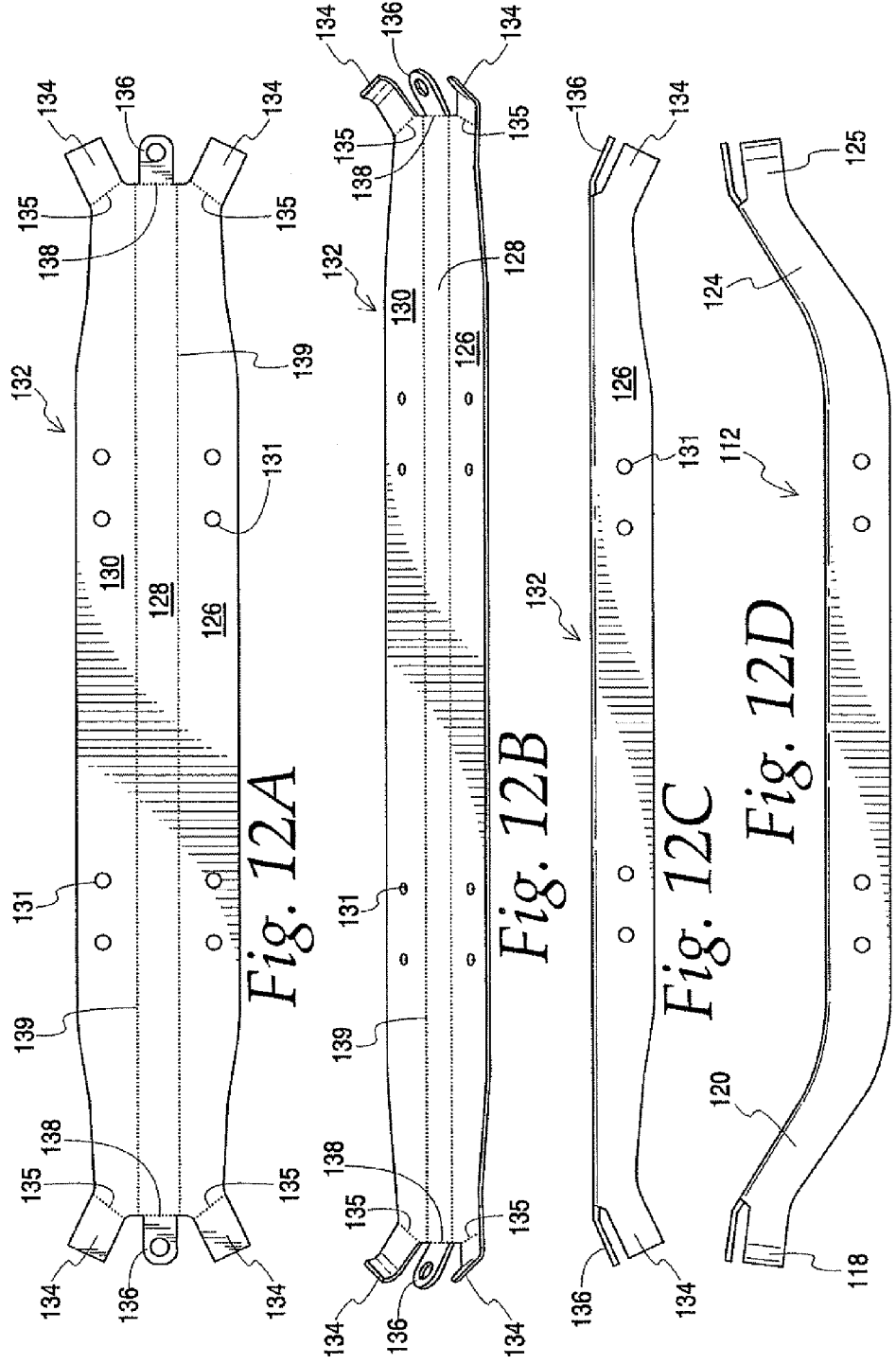

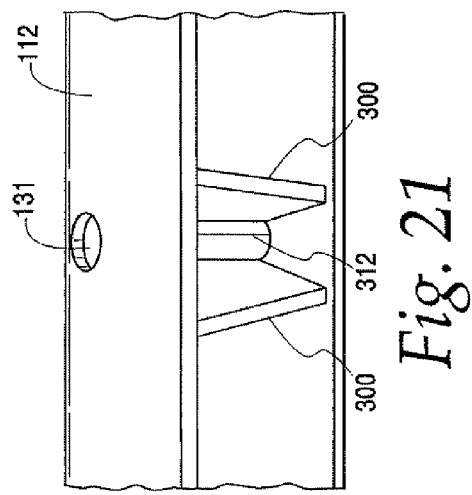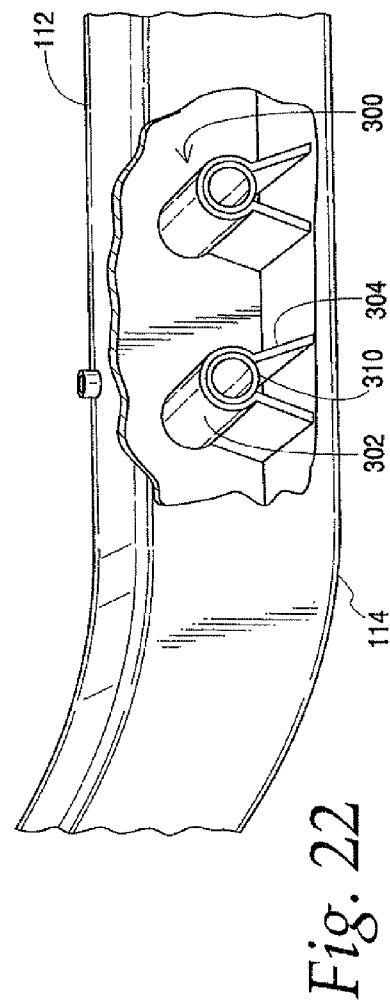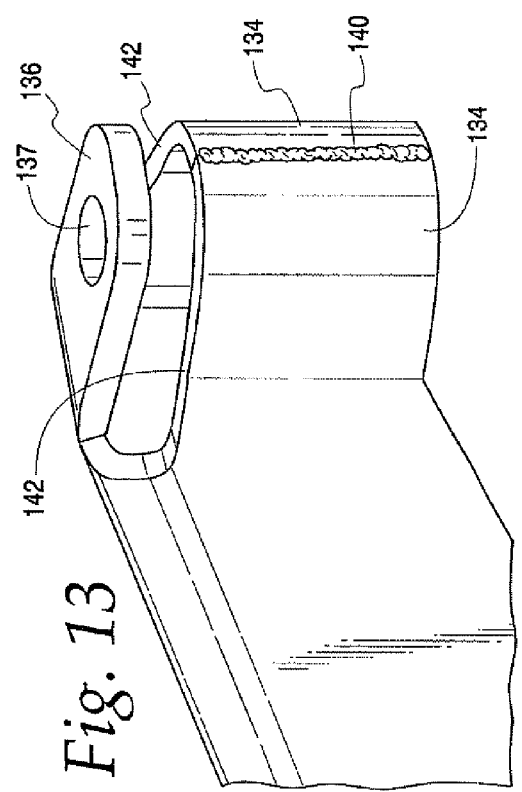

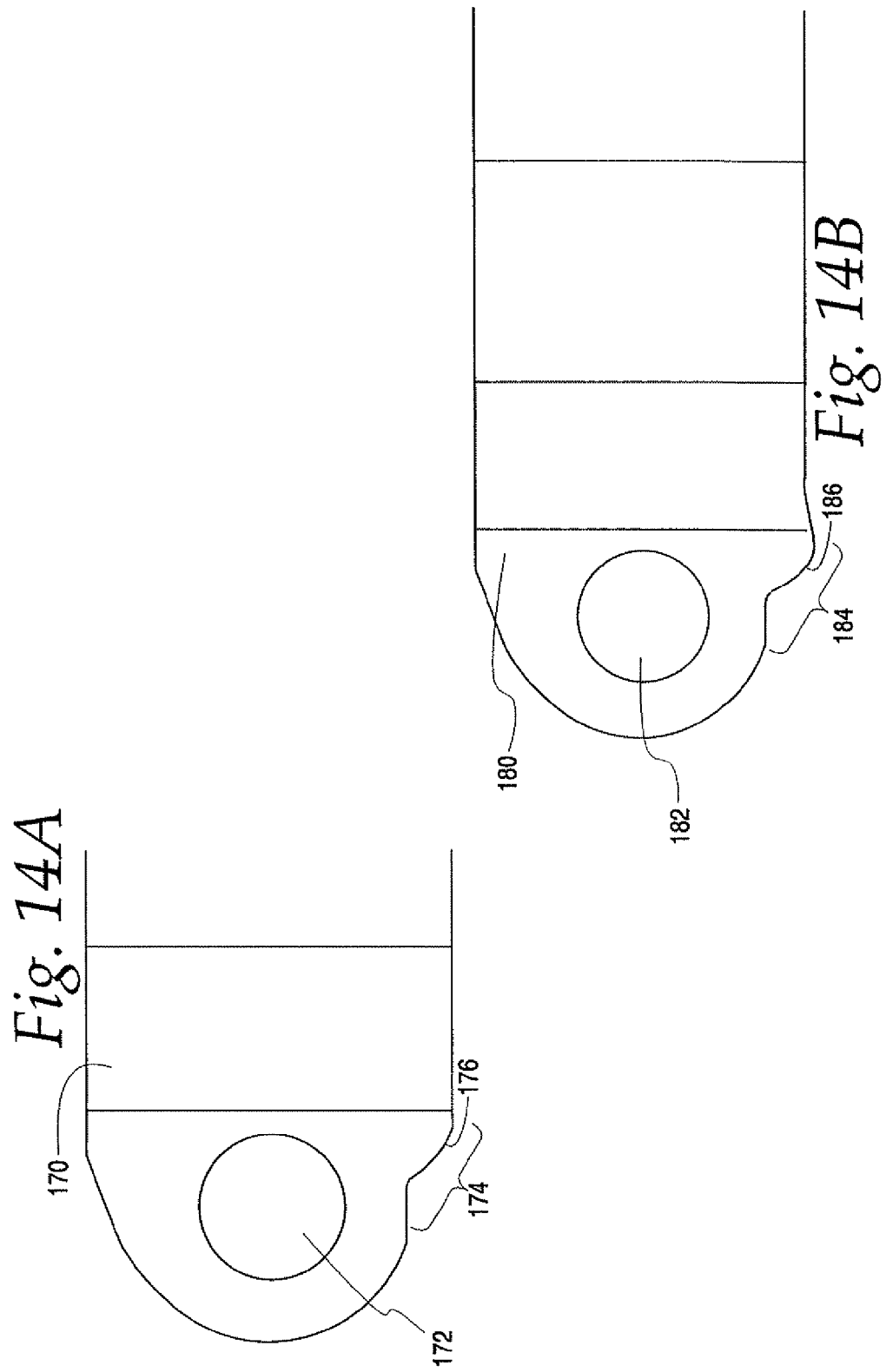

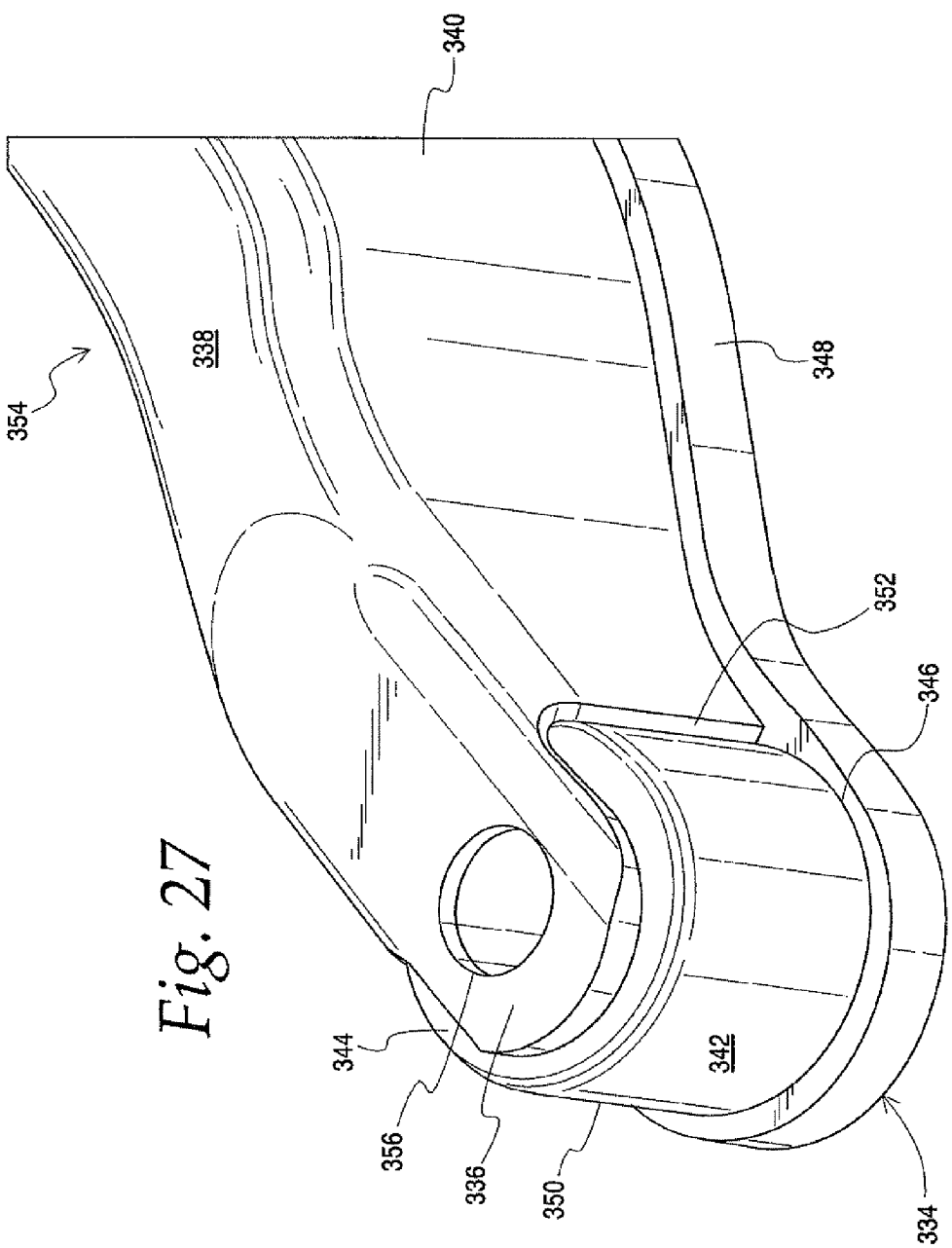

FABRICATED VEHICLE AXLE

BACKGROUND OF THE INVENTION

The present subject matter relates generally to axles for vehicles and more particularly to fabricated axles for vehicles and processes for making same.

Typical steer axle assemblies for vehicles include a forged I-beam axle, and a pair of steering knuckles pivotally attached to opposite ends of the axle by way of king pins. Although they are generally strong and reliable, such forged I-beam axles are limited in their shape, are relatively heavy, and require a relatively large amount of machining. All of this translates into increased manufacturing and payload costs.

In view of the foregoing, fabricated axles have been developed. Such axles are typically manufactured from sheets of steel that are cut and then welded together. Fabricated axles generally weigh less than forged I-beam axles. For at least one known application, a forged I-beam steering axle for use with heavy-duty trucks weighs approximately one hundred ninety-five pounds, whereas an equivalent typical fabricated axle weighs approximately one hundred twenty-five pounds. In the case of commercial vehicles, including heavy-duty truck commercial vehicles, this translates into substantially increased payload capacity.

Another benefit of fabricated axles is that the material used (e.g., steel) can be spread around for more efficient distribution thereof. This can contribute to making the fabricated axle much lighter, and can even make it stiffer against both bending and torsion stresses. On top of all this, fabricated axles typically require less machining than forged I-beam axles. Accordingly, they are easier and less expensive to manufacture.

An example of a known fabricated axle is shown and described in U.S. Pat. No. 5,810,377, which is hereby incorporated herein by reference. The fabricated axle disclosed therein was a marked improvement over what was then the prior art and it is still useful for most purposes. However, it has now been recognized to have certain deficiencies. Principally, that fabricated axle does not utilize material optimally, causing increased costs in manufacture and material waste.

This disadvantage led to the development of further improved designs. For example, the fabricated axle shown and described in U.S. Pat. No. 6,609,764, which is hereby incorporated herein by reference, addressed many of said deficiencies. In particular, the axle described in U.S. Pat. No. 6,609,764 employs a main body formed from a rectangular blank, with only a small amount of the blank being wasted.

While the axle described in U.S. Pat. No. 6,609,764 successfully reduced the amount of waste material, it was not without its own disadvantages. For example, the main body of the axle is relatively short, thus requiring the attachment of a number of relatively heavy components, such as a pair of top king pin plates and gooseneck parts. Additionally, the multiplicity of components may increase manufacturing costs and complexity. For example, one manufacturing process is described as employing a three-pass weld to secure the various components to each other.

FIG. 1 illustrates a portion of yet another known fabricated vehicle axle A. The axle A includes a straight main body B having a U- or C-shaped cross-section and a continuous bottom plate P secured thereto. Separate goosenecks G (only one of which is illustrated) are welded to the ends of the main body B and to the bottom plate P. The goosenecks G are provided as cast components having a forked portion F, which provides an additional location by which to weld the gooseneck G to the main body B. In addition to their already heavy composition, the cast goosenecks G provide a relatively abrupt transition at the ends of the main body B, which further increases the weight of the axle A by requiring a three-pass weld to secure the gooseneck G and a portion of the main body B to the bottom plate P and rendering the material M under the gooseneck G redundant and effectively wasted.

FIG. 2 illustrates a portion of still another fabricated vehicle axle A'. This axle A' is described in U.S. Pat. No. 7,862,058, the full disclosure of which is hereby incorporated herein by reference. The axle A' includes a main body B' having a U- or C-shaped cross-section and a continuous bottom plate P' secured thereto. Main body B' includes a relatively elongated gooseneck portion G' and extends to the head of axle A'. A king pin fixture K having a substantially cylindrical shape is illustrated. King pin fixture K is secured to gooseneck portion G', thereby minimizing the size of the king pin fixture. This axle A' has the advantage of a simple cylindrical machined head that easily can be made solid for tapered king pin applications. Nonetheless, the axle A' (and particularly the kingpin fixture of axle A') may not be as robust as may be required for some applications.

It is desirable to overcome one or more of the foregoing shortcomings, or alternatively other shortcomings not specified herein but associated with prior fabricated axles.

SUMMARY OF THE INVENTION

The invention is not limited by this section of the description. Rather, the invention extends to all embodiments and variations described in this specification.

In one design, a fabricated vehicle axle has a main beam formed by a channel and a bottom plate secured to the channel. The main beam forms a first axle head section, a first axle gooseneck section adjacent to the first axle head section, an axle midsection adjacent to the first axle gooseneck section, a second axle gooseneck section adjacent to the axle midsection, and a second axle head section adjacent to the second axle gooseneck section. The channel has an inverted U-shaped configuration along its midsection defining a channel front wall, a channel rear wall and a channel top wall. The channel extends from the first axle head section to the second axle head section.

The channel includes a first extension extending from its front wall and a second extension extending from its rear wall. The first and second extensions wrap around and join together to close off the end of the axle at the first axle head section. Similarly, the channel includes a third extension extending from its front wall and a fourth extension extending from its rear wall. The third and fourth extensions wrap around and join together to close off the end of the axle at the second axle head section. Head plates are secured to the channel at opposite axle head sections.

In another design, cover flap extensions extend from opposite ends of the channel top wall and serve as cover flaps for the axle head sections. The cover flaps are spaced apart from the upper edges of their adjacent front and rear wall extensions to allow an additional plate to be inserted for additional king pin support.

BRIEF DESCRIPTION OF THE SEVERAL VIEWS OF THE DRAWING

In the following detailed description, reference will frequently be made to the following views of the drawing, in which like reference numerals refer to like components, and in which:

FIG. 1 is a perspective view of a portion of a prior art vehicle axle;

FIG. 2 is a perspective view of a portion of another prior art vehicle axle;

FIG. 3 is a perspective view of a vehicle axle constructed in accordance with the principles set forth herein;

FIG. 4 is a perspective view of a portion of the vehicle axle shown in FIG. 3;

FIG. 5 is a portion of a cross-sectional view of the vehicle axle shown in FIG. 3, taken along lines 5-5 thereof;

FIG. 6A is a plan view of material used to form the channel structure used to make the vehicle axle shown in FIG. 3;

FIG. 6B is an elevational view of the material shown in FIG. 6A after undergoing initial processing;

FIG. 6C is an elevational view of the material shown in FIG. 6B after undergoing further processing;

FIG. 6D is an elevational view of the material shown in FIG. 6C after undergoing further processing;

FIG. 8 is an edge view of the bottom plate structure used in the vehicle axle shown in FIGS. 3 and 9;

FIG. 9 is a perspective view of another vehicle axle constructed in accordance with the principles set forth herein;

FIG. 10 is a perspective view of a portion of the vehicle axle shown in FIG. 9;

FIG. 11 is a portion of a cross-sectional view of the vehicle axle shown in FIG. 9, taken along lines 11-11 thereof;

FIG. 12A is a plan view of material used to form the channel structure used to make the vehicle axle shown in FIG. 9;

FIG. 12B is an elevational view of the material shown in FIG. 12A after undergoing initial processing;

FIG. 12C is an elevational view of the material shown in FIG. 12B after undergoing further processing;

FIG. 12D is an elevational view of the material shown in FIG. 12C after undergoing further processing;

FIG. 13 is a perspective view of a portion of the channel structure used in the vehicle axle shown in FIG. 9;

FIG. 14A is a plan view of an embodiment of a portion of a bottom plate that can be used in the vehicle axles shown herein;

FIG. 14B is a plan view of another embodiment of the portion of the bottom plate shown in FIG. 14A;

FIG. 21 is a perspective view of the torsion resistor shown in FIG. 20 installed within a vehicle axle channel;

FIG. 22 is an open perspective view of torsion resistors shown in FIG. 20 installed within a vehicle axle;

FIG. 27 is a perspective view of the vehicle axle shown in FIG. 25.

DETAILED DESCRIPTION OF THE INVENTION

Figure 7:
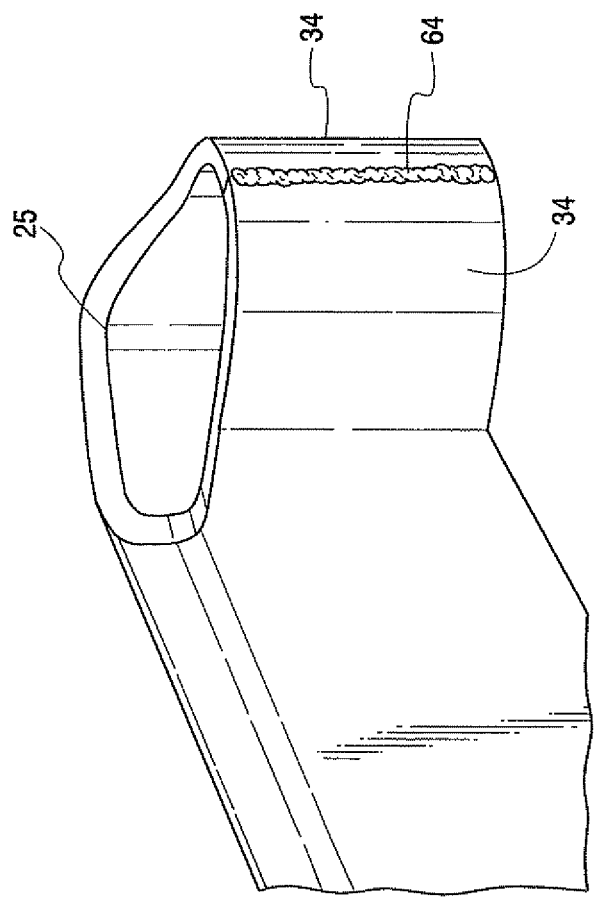
FIG. 7 is a perspective view of a portion of the channel structure used in the vehicle axle shown in FIG. 3.

The embodiments disclosed herein are for the purpose of providing the required description of the present subject matter. These embodiments are only exemplary. Specific details disclosed herein are not to be interpreted as limiting the subject matter as defined in the accompanying claims, unless such details are expressly recited in the claims.

FIG. 3 illustrates a fabricated vehicle axle generally designated 10. Axle 10 includes a channel 12 and a bottom plate 14 together forming a main body 15. Axle 10 also has first and second end (head) sections 18, 25 at each end thereof. A head plate 16 is positioned at each head section 18, 25 of axle 10. Channel 12, bottom plate 14 and the head plates 16 are secured together, for example by welding operations, along their respective points and lines of intersection. Channel 12, bottom plate 14 and head plates 16 may be made from a variety of suitable materials, such as high-strength low alloy ("HSLA") steel.

The main body 15 has a first gooseneck section 20, a midsection 22, and a second gooseneck section 24. FIG. 4 illustrates the first head section 18 of axle 10 and the first gooseneck section 20 and part of midsection 22 of main body 15.

Referring to FIG. 5, channel 12 has an inverted U-shaped vertical cross-section at those portions thereof associated with the midsection 22 and the first and second gooseneck sections 20, 24 of main body 15. As shown, channel 12 includes a front wall 26, a top wall 28 and a rear wall 30. Front and rear walls 26, 30 include axle seat bolt holes 31 to permit mounting of an axle seat for suspension components (see FIGS. 3 and 4). It will be noted that FIG. 5 does not show bottom plate 14.

As used herein, the term "U-shaped" is used broadly and is not limited to the illustrated configuration of channel 12 having a pair of downwardly extending front and rear walls 26, 30 that are generally perpendicular to a top wall 28. Other configurations within the scope of that term may include, for example, downwardly extending walls or legs that are inclined with respect to a top wall or curved to provide a generally C-shaped cross-section.

FIGS. 6A-6D illustrate four progressive steps for forming channel 12. FIG. 6A illustrates a first step wherein a flat 32 is cut or otherwise removed from a rectangular blank of material. As shown, flat 32 includes front wall 26, top wall 28 and rear wall 30. Axle seat bolt holes 31 may be formed in the front and rear walls 26, 30 of flat 32. The flat 32 is shaped to include tab-like end extensions 34 extending from each end of each of the front and rear walls 26, 30. End extensions 34 may be bent upward along bend lines 36 to the configuration of FIG. 6B.

Flat 32 is preferably built into the rectangular blank of material, as described. This eliminates the need to trim the bottom edge of channel 12 once it is bent and formed to mate with bottom plate 14. Laser or machining this profile after bending would require costly equipment and take considerable time.

FIG. 6C illustrates a third step for forming channel 12 wherein flat 32 illustrated in FIG. 6B is bent along bend lines 38 illustrated therein. Coincidental with this bending of flat 32, each end of channel 12 is closed off by its proximate end extensions 34, namely the proximate end extension for front wall 26 and the proximate end extension for rear wall 30.

FIG. 6D illustrates a fourth step for forming channel 12 wherein the channel is further bent upwards at its end portions so that it assumes an inverted gull-wing type shape when viewed from the front or rear. In this step, channel 12 is formed to define the portions thereof associated with the upwardly and outwardly extending gooseneck sections 20, 24 of main body 15 and the primarily outwardly extending head sections 18, 25 of axle 10 (see also FIGS. 3 and 4). The portions of channel 12 associated with the gooseneck sections 20, 24 of main body 15 are substantially identical to each other and separated by a portion of the channel associated with the generally straight midsection 22 of the main body (see also FIGS. 3 and 4).

This fourth step for forming channel 12 may be carried out by a number of beam-bending or rolling techniques, or other forming methods. Methods that may be used include: (1) stamping in a male/female die set contoured to the final shape, (2) using a press brake with side bolsters to inhibit side wall deformation, (3) fluid cell (bag) press, (4) roll forming, (5) stretch forming, and (6) hydroforming.

In one exemplary method for forming channel 12 as illustrated in FIG. 6D, channel 12 is placed over a multi-piece mandrel so that the mandrel is inserted into the open end (bottom) of channel 12. The mandrel includes three pieces, with two of the pieces being relatively short end pieces (corresponding to the portions of channel 12 associated with gooseneck sections 20, 24 of main body 15) and the third being a longer central piece (corresponding to the portion of the channel associated with midsection 22 of the main body). The mandrel pieces are arranged end-to-end and generally prevent channel 12 from deforming inwardly during the forming process.

Each outer end of the end mandrel pieces is carried by a stationary support, with each inner end thereof being carried by an associated resilient support. Resilient supports also support the ends of the central mandrel piece. The resilient supports may be variously provided, such as deformable pads or hydraulic/air cylinders or the like. Resilient supports allow for pivoting of the end mandrel pieces (i.e., downward relative movement of the inner ends of the end mandrel pieces with respect to the outer ends thereof). A pivot mechanism is associated with each end mandrel piece to further facilitate such pivoting action. The pivoting action allows the end mandrel pieces to generally follow the shape of the portions of channel 12 associated with the gooseneck sections 20, 24 of main body 15 during the forming process.

A forming or radius die is provided above channel 12, the mandrel pieces, and supports. The forming die has an inverted U-shaped cross-section that defines a channel for receiving channel 12. The sides of this channel are defined by side bolsters that generally conform to the downwardly extending front and rear walls 26, 30 of channel 12 and prevent the walls from bowing outwardly in the bend-effected zones during the process, thereby preserving a substantially uniform width along channel 12. The top portion of this channel is pressed into contact with top wall 28 of channel 12 by a punch and is shaped like the final curvature of channel 12. Due to material springback, the actual curvature of the gooseneck portions typically has a slightly greater radius of curvature than that of the punch, which may be considered when designing the tooling.

In use, the mandrel pieces are placed on the supports and channel 12 is positioned on the mandrel pieces. The forming die is then moved downwardly to contact channel 12. The contoured top portion of the forming die channel forces the center portion of channel 12 downwardly as the resilient supports move downwardly to allow for such movement. The stationary supports maintain the end portions of channel 12 at a higher elevation, thereby forcing the channel to bend in the areas between the stationary supports and the adjacent resilient support. The end mandrel pieces pivot about the associated pivot mechanism to allow for this bending of channel 12. The presence of the mandrel and the side bolsters prevents the bent portions of channel 12 from deforming inwardly or outwardly, thereby maintaining the U-shaped cross-section of the channel at the bent portions thereof associated with gooseneck portions 20, 24 of main body 15 during and after forming. In this method, the entire channel 12 is formed in a single (one hit) operation.

In another exemplary method for forming channel 12 as illustrated in FIG. 6D, each end portion of the channel is formed separately. This method requires two operations (or hits), one for each end portion of channel 12. Because each end portion of the channel is formed independently, each end portion may be adjusted as desired. The tooling for this method is substantially less expensive than the tooling for the aforementioned forming method.

FIG. 7 illustrates one end of channel 12 at its head portion 25 and, particularly, the end wrap formed at that end of the channel. During the channel forming step illustrated by FIG. 6C, end extensions 34 are wrapped around and joined together along a vertically extending weld seam 64 to define the head portion 25 of channel 12. As such, an opening is formed, and a king pin (not shown) may extend through this opening. The weld seam 64 joining end extensions 34 is preferably positioned at the far end of axle 10, as shown, where operational stresses are at a minimum.

FIG. 8 illustrates the bottom plate 14 of the fabricated axle 10. The bottom plate 14 is provided as a rectangular strip of material that is formed (e.g., by bending) to provide a substantially flat body portion 66 associated with the midsection 22 of main body 15, upwardly and outwardly extending gooseneck portions 68, 70 associated with the first and second gooseneck sections 20, 24 of the main body, and primarily outwardly extending head portions 72, 74 associated with the first and second end sections 18, 25 of the axle. Bottom plate 14 generally matches the contour of channel 12 and is welded thereto, as shown in FIGS. 3 and 4, to form the box-like section of main body 15. Bottom plate 14 is preferably slightly wider than channel 12 to provide a convenient welding surface. Large bend radii on bottom plate 14 eliminate stress concentrations and improve the durability of the welds joining channel 12 to the bottom plate.

Still referring back to FIGS. 3 and 4, it will be appreciated that a king pin bore is machined through each head plate 16, as shown. Similarly, king pin bores are machined through the head portions 72, 74 of bottom plate 14. The king pin bores at each head section 18, 25 of axle 10 are aligned. The height at each head section 18, 25 of axle 10 is smaller than prior axle head configurations, allowing shorter king pins and steering knuckles to be used and permitting ample space for air disc brake packaging.

While the axle described in detail above is an improvement over many prior axles, variations to such axle may also be made without departing from the scope of the present disclosure. For example, the embodiments which follow may be particularly advantageous for axles intended for relatively high load or stress conditions and applications.

FIG. 9 illustrates a fabricated vehicle axle generally designated 110. Axle 110 includes a channel 112 and a bottom plate 114 together forming a main body 115. Axle 110 also has first and second end (head) sections 118, 125 at each end thereof. A head plate 116 is positioned at each head section 118, 125 of axle 110. Channel 112, bottom plate 114 and the head plates 116 are secured together, for example by welding operations, along their respective points and lines of intersection. As described further herein, the head plates 116 are sandwiched within channel 112 at opposite end sections 118, 125 of the axle. Channel 112, bottom plate 114 and head plates 116 may be made from a variety of suitable materials, such as HSLA steel.

The main body 115 has a first gooseneck section 120, a midsection 122, and a second gooseneck section 124. FIG. 10 illustrates head section 125 of axle 110 and the second gooseneck section 124 of the main body. Preferably, the entire mating surface between the channel 112 and the head plate 116 is welded, including the top surface, bottom surface and back edge of the head plate.

Also illustrated in FIG. 10 is a king pin 100 in its desired position to permit mounting of a steering knuckle (not shown). King pins 100 are likewise illustrated in FIG. 9.

FIG. 11 illustrates channel 112 as having an inverted U-shaped vertical cross-section at those portions thereof associated with the midsection 122 and the first and second gooseneck sections 120, 24 of main body 115. Channel 112 includes a front wall 126, a top wall 128 and a rear wall 130. Front and rear walls 126, 130 include axle seat bolt holes 131 (FIG. 9) to permit mounting of an axle seat for suspension components. It will be appreciated that FIG. 11 does not show bottom plate 114.

FIGS. 12A-12D illustrate four progressive steps for forming channel 112. FIG. 12A illustrates a first step wherein a flat 132 is cut or otherwise removed from a rectangular blank of material. As shown, flat 132 includes front wall 126, top wall 128 and rear wall 130. Axle seat bolt holes 131 may be cut or formed in flat 132. The flat 132 is shaped to include tab-like end extensions 134 extending from each end of each of the front and rear walls 126, 130. End extensions 134 may be bent upward along bend lines 135 to the configuration of FIG. 12B.

Flat 132 is also shaped to include tab-like extensions 136 extending from each end of the top wall 128. As further described herein, tab-like extensions 136 correspond to axle head cover flaps for axle 110. King pin holes 137 may be formed in flat 132 within each tab-like extension 136, as shown in FIG. 13. Tab-like extensions 136 may be bent upward along bend lines 138 to the configuration of FIG. 12B.

Flat 132 is preferably built into the rectangular blank of material, as described. This eliminates the need to trim the bottom edge of channel 112 once it is bent and formed to mate with bottom plate 114. Laser or machining this profile after bending would require costly equipment and take considerable time.

FIG. 12C illustrates a third step for forming channel 112 wherein flat 132 illustrated in FIG. 12B is bent along bend lines 139 illustrated therein. During this bending of flat 132, each end of channel 112 is closed off by its proximate end extensions 134, namely the proximate end extension for front wall 126 and the proximate end extension for rear wall 130. Each end of channel 112 is also covered by its proximate extension 136 serving as a cover flap for the channel end.

FIG. 12D illustrates a fourth step for forming channel 112 wherein the channel is further bent upwards at its end portions so that it assumes an inverted gull-wing type shape when viewed from the front or rear. In this step, channel 112 is formed to define the portions thereof associated with the upwardly and outwardly extending gooseneck sections 120, 124 of main body 115 and the primarily outwardly extending head sections 118, 125 of axle 110 (see also FIGS. 9 and 10). The portions of channel 112 associated with the gooseneck sections 120, 124 of main body 115 are substantially identical to each other and separated by a portion of the channel associated with the generally straight midsection 122 of the main body (see also FIGS. 9 and 10).

This fourth step for forming channel 112 may be carried out by a number of beam-bending or rolling techniques, or other forming methods, including those techniques and methods already described herein.

FIG. 13 illustrates one end of channel 112 at its head portion and, particularly, the end wrap and cover flap formed at that end of the channel. During the channel forming step illustrated by FIG. 12C, end extensions 134 are wrapped around and joined together along a vertically extending weld seam 140. In addition, extension 136 folds down and forms a cover flap for the end of the channel. In the illustration, extension 136 covers the top of the channel end. Extension 136 extends generally parallel to the upper edges 142 of the joined end extensions 134. There is a space between the bottom surface of the cover flap formed by extension 136 and the upper edges 142 of end extensions 134. This configuration defines the head portion of channel 112. In this configuration, a king pin (not shown) may extend through king pin hole 137 and the opening formed by end extensions 134. The weld seam 140 joining end extensions 134 is preferably positioned at the far end of axle 110, as shown, where operational stresses are at a minimum.

The bottom plate 114 of the fabricated axle 110 may have the form of bottom plate 14 illustrated in FIG. 8. The bottom plate 114 is provided as a rectangular strip of material that is formed (e.g., by bending) to provide a substantially flat body portion (illustrated as 66 in FIG. 8) associated with the midsection 122 of main body 115, upwardly and outwardly extending gooseneck portions (illustrated as 68 and 70 in FIG. 8) associated with the first and second gooseneck sections 120, 124 of the main body, and primarily outwardly extending head portions (illustrated as 72 and 74 in FIG. 8) associated with the first and second end sections 118, 125 of the axle. Bottom plate 114 generally matches the contour of channel 112 and is welded thereto, as shown in FIGS. 9 and 10, to form the box-like section of main body 115. Bottom plate 114 is preferably slightly wider than channel 112 to provide a convenient welding surface. Large bend radii on bottom plate 114 eliminate stress concentrations and improve the durability of the welds joining channel 112 to the bottom plate.

FIG. 14A illustrates a first preferred head section 170 of bottom plate 114. A king pin hole 172 is cut or formed within head section 170. While bottom plate 114 is illustrated with a fully formed king pin hole 172, it may be advantageous to secure bottom plate 114 to channel 112 prior to machining king pin holes in bottom plate 114, as doing so promotes proper positioning of the king pin holes. Rather than fully formed king pin holes, bottom plate 114 may instead have smaller preliminary king pin holes that are used as a reference when the final king pin holes are eventually added to bottom plate 114. Additionally, the other contours of bottom plate 114 (which may be initially provided as a generally rectangular piece of material) may also be cut or formed after bottom plate 114 has been secured to channel 112 to ensure that the contours are correctly positioned with respect to the king pin holes.

A portion 174 of head section 170 corresponds to a built-in steering stop. As shown, steering stop portion 174 is defined by a slightly convex-shaped bottom plate edge 176. Edge 176 extends from the relatively narrow portion of the bottom plate head section to the relatively wide portion of the bottom plate head section (i.e., that portion of the bottom plate head section having a width equivalent to the width of the adjacent gooseneck section of the bottom plate). Edge 176 and steering stop portion 174 differ from prior steering stops built into axle bottom plates in that the transition between the relatively narrow portion of the bottom plate head section and the relatively wide portion of the bottom plate head section is sharper. The narrow portion of the bottom plate head section extends inboard to a greater extent so that this sharp transition defined by edge 176 is formed. Edge 176 and steering stop portion 174 also differ from prior steering stops built into axle bottom plates in that the edge is slightly convex-shaped as opposed to concave-shaped.

FIG. 14B illustrates a second preferred head section 180 of bottom plate 114. A king pin hole 182 is cut or formed within head section 180. A portion 184 of head section 180 corresponds to a built-in steering stop. As shown, steering stop portion 184 is defined by a generally convex-shaped bottom plate edge 186. Edge extends from a relatively narrow portion of the bottom plate head section to the relatively wide portion of the bottom plate head section (i.e., that portion of the bottom plate head section having a width equivalent to the wide of the adjacent gooseneck section of the bottom plate). As it so extends, edge 186 swings noticeably outwardly beyond such width to form its convex shape.

The preferred head sections 170, 180 of bottom plate 114 may be used in conjunction with the vehicle axles 10, 110 described in detail herein, or may be used with other axles utilizing a bottom plate.

Figure 15A:
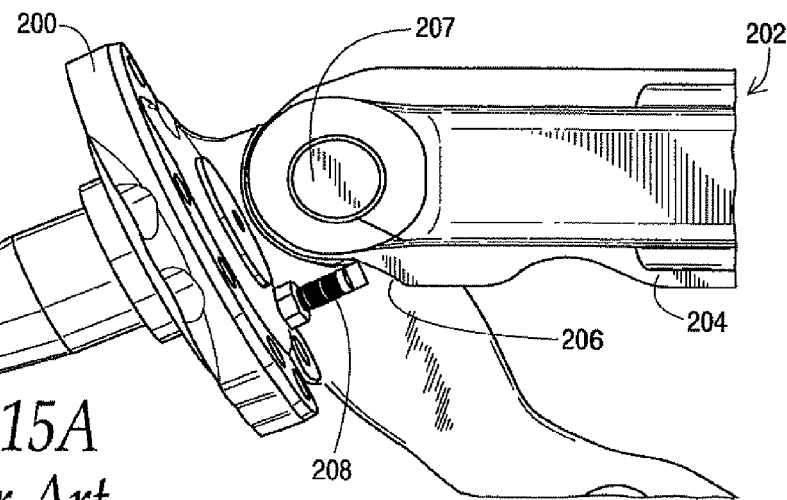
FIG. 15A is a plan view of a prior art vehicle axle and steering knuckle assembly.
Figure 15B:
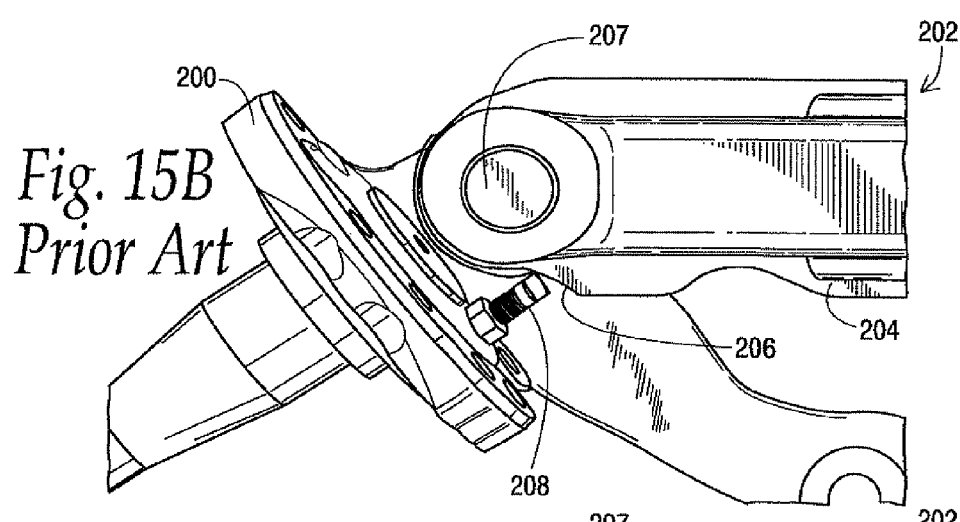
FIG. 15B is another plan view of the prior art vehicle axle and steering knuckle assembly shown in FIG. 15A.
Figure 15C:
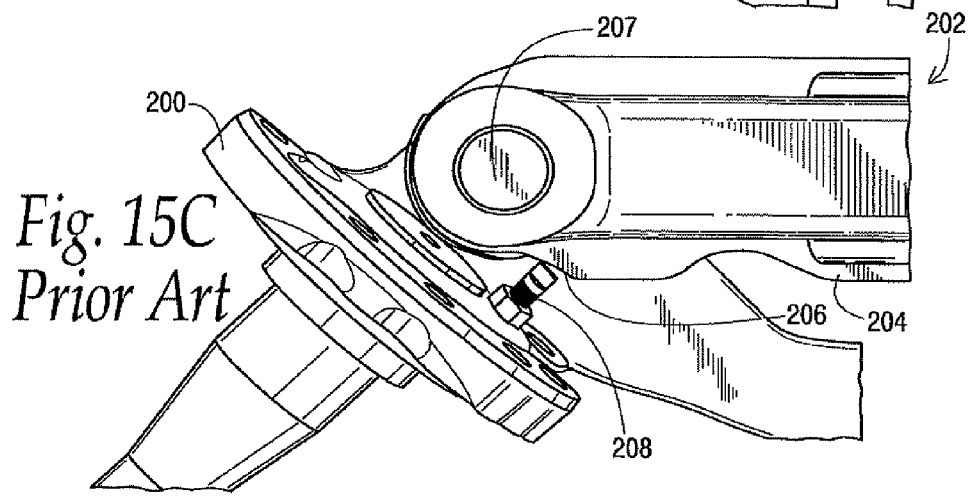
FIG. 15C is still another plan view of the prior art vehicle axle and steering knuckle assembly shown in FIGS. 15A-15B.

FIGS. 15A-15C illustrate a steering knuckle 200 mounted to a prior art vehicle axle 202 constructed, in part, by a bottom plate 204 that has a steering stop portion 206 formed by a concave-shaped bottom plate edge. Steering knuckle 200 is mounted to axle 202 by a king pin 207 in known manner.

Steering knuckle 200 includes a stop bolt 208 that may be adjustably inserted into the rear face of the steering knuckle backbone. In particular, the extent to which stop bolt 208 is inserted into the backbone of steering knuckle 200, and correspondingly the length of stop bolt 208 extending from the steering knuckle backbone, may be adjusted via the threads on the stop bolt.

FIG. 15A illustrates stop bolt 208 threaded only slightly into the steering knuckle backbone so that it extends a relatively large distance therefrom. In this position, stop bolt 208 will contact the steering stop portion 206 of bottom plate 204 at a twenty-five degree wheel cut (such as when taking a left hand turn). As shown, in this arrangement, only the inside edge (or periphery) of the stop bolt end contacts steering stop portion 206 to prevent further rotation of steering knuckle 200 and, accordingly, further steering of the vehicle. This type of contact is inefficient and prone to wear or deformation of the stop bolt.

FIG. 15B illustrates stop bolt 208 threaded more into the steering knuckle backbone so that it extends a lesser distance therefrom. In this position, stop bolt 208 will contact the steering stop portion 206 of bottom plate 204 at a thirty-five degree wheel cut. Similarly, in this arrangement, only the inside edge of the stop bolt end contacts steering stop portion 206 to prevent further rotation of steering knuckle 200 and, accordingly, further steering of the vehicle. Again, this type of contact is inefficient and prone to wear or deformation of the stop bolt.

FIG. 15C illustrates stop bolt 208 threaded even more into the steering knuckle backbone so that it extends an even lesser distance therefrom. In this position, stop bolt 208 will contact the steering stop portion 206 of bottom plate 204 at a forty-five degree wheel cut. In this arrangement, the inside edge of the stop bolt end and a small part of the stop bolt end surface contact steering stop portion 206 to prevent further rotation of steering knuckle 200 and, accordingly, further steering of the vehicle. While slightly improved, this type of contact is still less desirable than if a greater percentage of the stop bolt end surface area were to contact the steering stop portion.

Figure 16A:
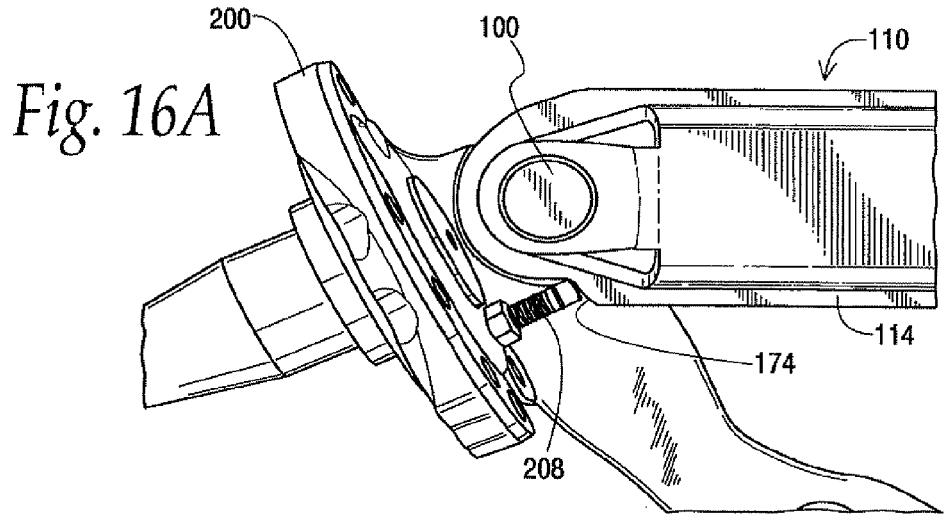
FIG. 16A is a plan view of the vehicle axle shown in FIG. 9 having the bottom plate shown in FIG. 14A, along with a steering knuckle assembly.
Figure 16B:
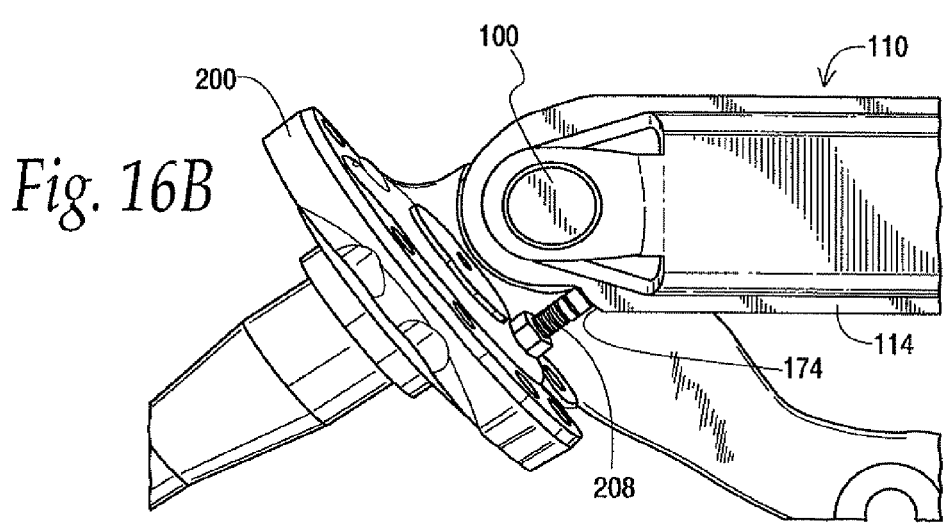
FIG. 16B is another plan view of the vehicle axle and steering knuckle assembly shown in FIG. 16A.
Figure 16C:
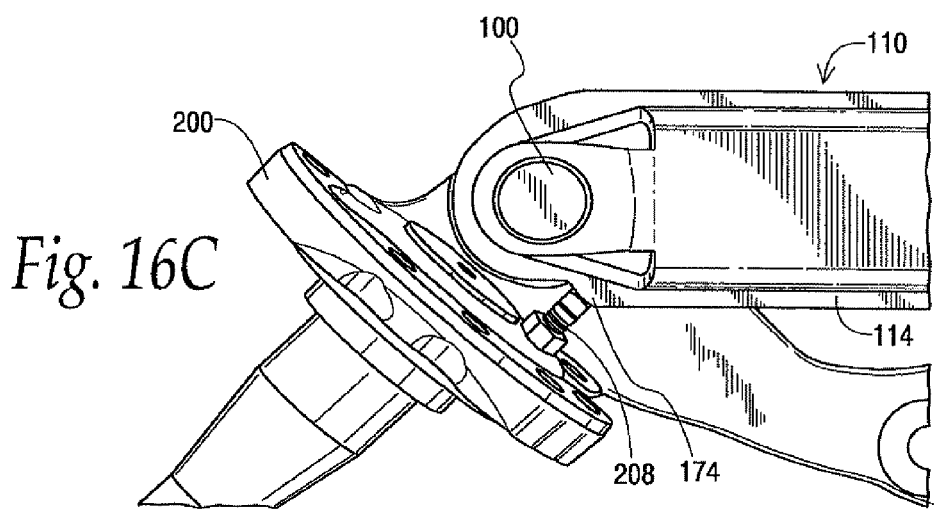
FIG. 16C is still another plan view of the vehicle axle and steering knuckle assembly shown in FIGS. 16A-16B.

FIGS. 16A-16C illustrate steering knuckle 200 mounted to vehicle axle 110. The bottom plate 114 shown in FIGS. 16A-16C is constructed to have the slightly convex-shaped steering stop portion 174 illustrated in FIG. 14A. Steering knuckle 200 is mounted to axle 110 by king pin 100 in known manner. Steering knuckle 200 includes a stop bolt 208, as previously described.

FIG. 16A illustrates stop bolt 208 threaded only slightly into the steering knuckle backbone so that it extends a relatively large distance therefrom. In this position, stop bolt 208 will contact the steering stop portion 174 of bottom plate 114 at a twenty-five degree wheel cut (such as when taking a left hand turn). As shown, in this arrangement, the inside edge (or periphery) of the stop bolt end and a portion of the stop bolt end surface area contact steering stop portion 174 to prevent further rotation of steering knuckle 200 and, accordingly, further steering of the vehicle. This type of contact is a significant improvement over the prior art arrangement illustrated in FIG. 15A and results in much less edge loading of the stop bolt.

FIG. 16B illustrates stop bolt 208 threaded more into the steering knuckle backbone so that it extends a lesser distance therefrom. In this position, stop bolt 208 will contact the steering stop portion 174 of bottom plate 114 at a thirty-five degree wheel cut. In this arrangement, a larger portion of the stop bolt end surface area contacts steering stop portion 174 to prevent further rotation of steering knuckle 200 and, accordingly, further steering of the vehicle. This results in less edge and more axial loading of the stop bolt as compared to the prior art arrangement illustrated in FIG. 15B.

FIG. 16C illustrates stop bolt 208 threaded even more into the steering knuckle backbone so that it extends an even lesser distance therefrom. In this position, stop bolt 208 will contact the steering stop portion 174 of bottom plate 114 at a forty-five degree wheel cut. In this arrangement, the entirety of the stop bolt end surface area contacts steering stop portion 174 to prevent further rotation of steering knuckle 200 and, accordingly, further steering of the vehicle. It will be appreciated that there is even less edge loading of the stop bolt in the arrangement of FIG. 16C than in the arrangements of FIGS. 16A and 16B. Typically, a larger maximum wheel cut (e.g., forty-five degrees) is more desirable than a smaller maximum wheel cut (e.g., twenty-five or thirty-five degrees), so it may be advantageous to provide a steering stop portion which is configured to minimize edge loading of the stop bolt at a higher wheel cut, as is the case with the illustrated steering stop portion. However, other embodiments are also within the scope of the present disclosure, such as steering stop portions which minimize edge loading of the stop bolt at smaller maximum wheel cut arrangements.

Figure 17A:
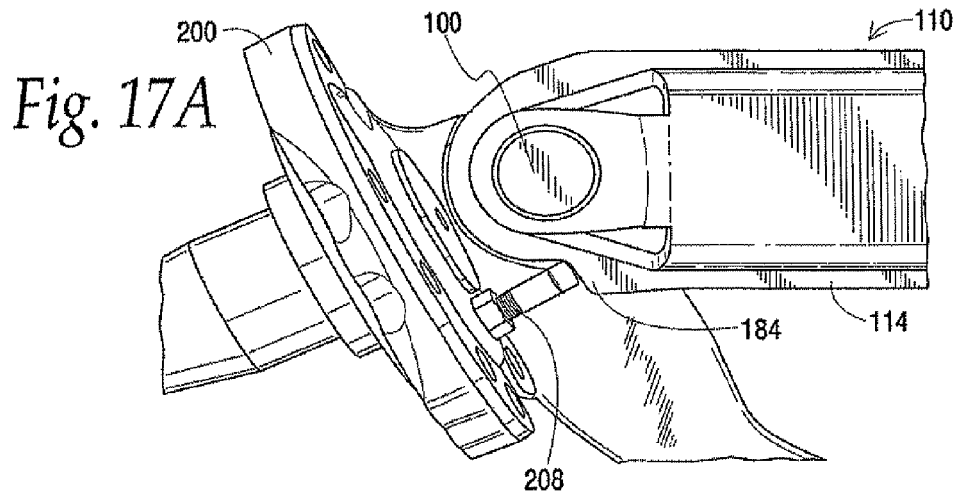
FIG. 17A is a plan view of the vehicle axle shown in FIG. 9 having the bottom plate shown in FIG. 14B, along with a steering knuckle assembly.
Figure 17B:
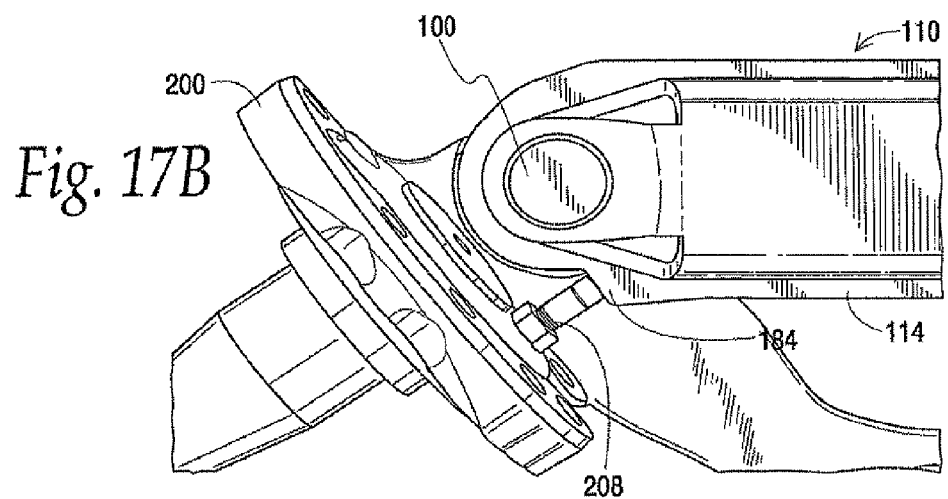
FIG. 17B is another plan view of the vehicle axle and steering knuckle assembly shown in FIG. 17A.
Figure 17C:
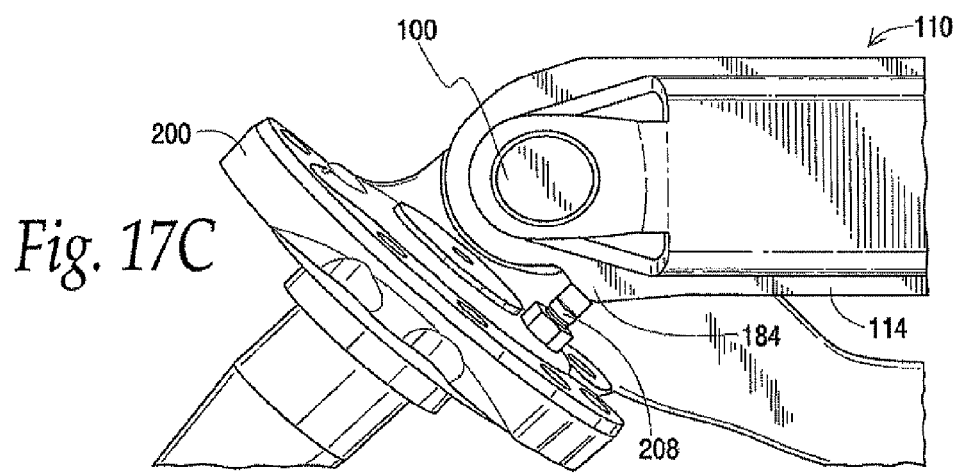
FIG. 17C is still another plan view of the vehicle axle and steering knuckle assembly shown in FIGS. 17A-17B.

FIGS. 17A-17C illustrate steering knuckle 200 mounted to vehicle axle 110. The bottom plate 114 shown in FIGS. 17A-17C is constructed to have the convex-shaped steering stop portion 184 illustrated in FIG. 14B. Steering knuckle 200 is mounted to axle 110 by king pin 100 in known manner. Steering knuckle 200 includes a stop bolt 208, as previously described.

FIG. 17A illustrates stop bolt 208 threaded only slightly into the steering knuckle backbone so that it extends a relatively large distance therefrom. In this position, stop bolt 208 will contact the steering stop portion 184 of bottom plate 114 at a twenty-five degree wheel cut (such as when taking a left hand turn). As shown, in this arrangement, the entirety of the stop bolt end surface area contacts steering stop portion 184 to prevent further rotation of steering knuckle 200 and, accordingly, further steering of the vehicle. This is a significant improvement over the arrangement illustrated in FIG. 15A and results in much less edge loading of the stop bolt.

FIG. 17B illustrates stop bolt 208 threaded more into the steering knuckle backbone so that it extends a lesser distance therefrom. In this position, stop bolt 208 will contact the steering stop portion 184 of bottom plate 114 at a thirty-five degree wheel cut. In this arrangement, the entirety of the stop bolt end surface area contacts steering stop portion 184 to prevent further rotation of steering knuckle 200 and, accordingly, further steering of the vehicle. In the arrangement of FIG. 17B, the stop bolt is more axially loaded than the stop bolt of FIG. 16B (which is also configured for a thirty-five degree maximum wheel cut), so the steering stop portion of FIG. 17B may be preferable for applications requiring a thirty-five degree maximum wheel cut.

FIG. 17C illustrates stop bolt 208 threaded even more into the steering knuckle backbone so that it extends an even lesser distance therefrom. In this position, stop bolt 208 will contact the steering stop portion 184 of bottom plate 114 at a forty-five degree wheel cut. In this arrangement, the entirety of the stop bolt end surface area contacts steering stop portion 184 to prevent further rotation of steering knuckle 200 and, accordingly, further steering of the vehicle. It will be seen that, as in the arrangement of FIG. 16C, the stop bolt is entirely axially loaded, but the particular contours of steering stop portion 184 may be more tailored to the shape of the end of the stop bolt than steering stop portion 174, thereby contacting the stop bolt over a larger surface, which may be preferable for load distribution purposes.

Figure 18:
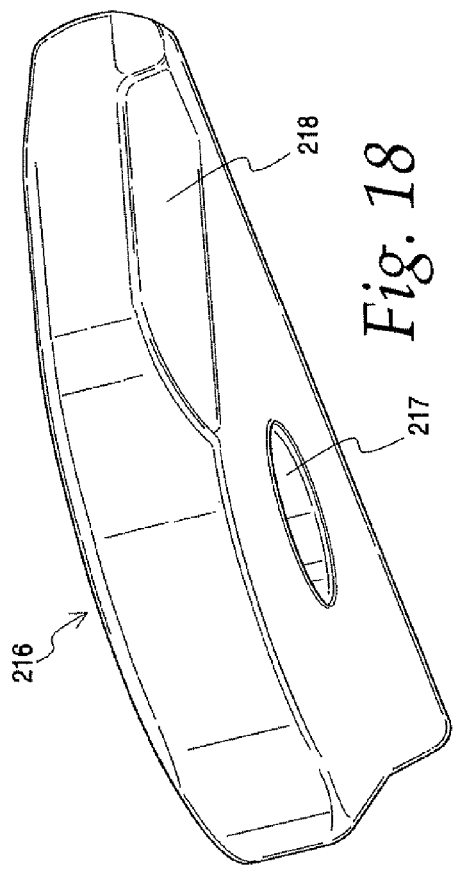
FIG. 18 is a perspective view of a vehicle axle head plate.

FIG. 18 illustrates a preferred head plate 216 for use with axle 110. Head plate 216 may also be used with axle 10 and other axles, where appropriate.

Head plate includes a hole 217 to permit a king pin to extend through it. Head plate 216 also includes angled or chamfered surfaces forming side chamfers 218 that facilitate higher penetration welds to maximize the strength at the interface between the head plate and channel 112. It will be appreciated that while only one of the side chamfers 218 is illustrated in FIG. 18 at one side of head plate 216, another side chamfer is formed into the opposite side of the head plate.

Side chamfers 218 are formed into head plate 216 to allow portions of the upper edges 142 of channel end extensions 134 (shown in FIG. 13) to project slightly radially outwardly from head plate 216. Those portions of upper edges 142 are exposed and form shelves that allow more weld metal to be deposited during the welding process. This additional weld metal strengthens the interface between head plate 216 and channel 112.

Figure 19:
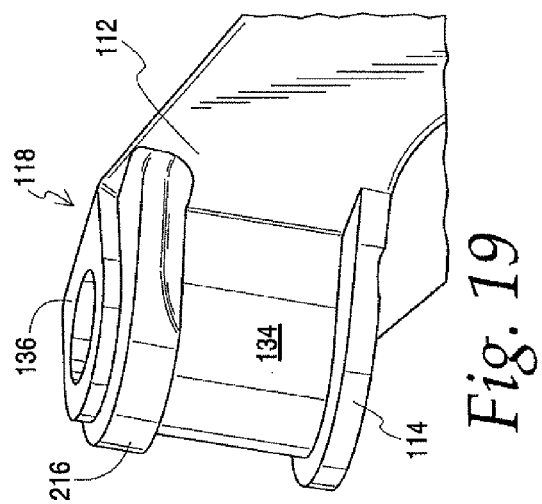
FIG. 19 is a perspective view of a portion of a vehicle axle using the head plate shown in FIG. 18.

FIG. 19 illustrates an axle head portion 118 wherein preferred head plate 216 is used. A portion of the proximate gooseneck portion for the axle is also illustrated. The axle head portion 118 includes channel 112 welded to bottom plate 114. As previously described, channel 112 is closed off by the end extensions 134 and the cover flap 136. Head plate 216 is positioned within the space between the bottom surface of cover flap 136 and the upper edges 142 of the end extensions (see also FIG. 13). As noted, use of head plate 216 provides for greater integrity of the interface between the head plate and channel 112, which in turn produces a more reliable axle head portion.

With regard to the design of the various embodiments of axle 110 described above, it has been determined that, in order to achieve extended useful life, it is important to protect the welds joining channel 112 with bottom plate 114, particularly those portions in the areas near the axle seats. Such welds are most prone to cracking in the areas near the outboard axle seat bolts.

Figure 20:
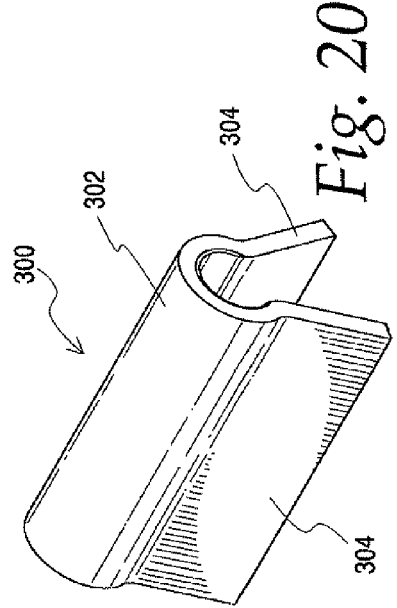
FIG. 20 is a perspective view of a torsion resistor.

FIG. 20 illustrates a torsion resistor 300 having a keyhole-like shape. In that regard, torsion resistor 300 includes an axially extending rounded surface 302 defining an arc in cross-section. The arc preferably extends beyond a semicircle (i.e., having an arc angle greater than one hundred eighty degrees), as shown. Torsion resistor 300 also includes wings 304 forming surfaces extending approximately radially outwardly from the opposite ends of such arc. While described with reference to vehicle axle 110, it will be understood that torsion resistor 300 can also be used with vehicle axle 10 and other axles having mounting holes extending through oppositely positioned walls of a box-shaped beam.

FIGS. 21 and 22 illustrate the U-shaped channel 112 with axle seat bolt holes 131. A torsion resistor 300 is installed within channel 112. A metal retaining sleeve 310 is axially inserted, preferably by press fit, within the rounded surface 302 of torsion resister 300. Retaining sleeve 310 includes an axially extending gap 312 permitting tolerance flexibility. Retaining sleeve 310 will spring radially outwardly to press against the inner diameter of the torsion resistor rounded surface 302. Retaining sleeve 310 functions to hold torsion resistor 300 in place.

Torsion resistors 300 are preferably clamped in place by clamp assembly bolts (not shown) during the assembly process. Following the assembly process, the clamp assembly bolts are removed and then the axle seat (not shown) may be mounted on the axle. Torsion resistors 300 stiffen the axle beam and react against torsional loads. Additional weld passes also aid in preventing cracking between channel 112 and bottom plate 114 in the noted areas.

FIGS. 23-27 illustrate an additional aspect of the present disclosure which may be employed in combination with axles according to the present disclosure or other axles in general. However, the principles discussed below increase the strength of the axle at its end or head sections, so it may be particularly advantageous for them to be employed in combination with an axle having cover flap extensions of the type described above with reference to FIG. 9, as a cover flap integrally formed with the channel results in a more robust end section.

Figure 23:
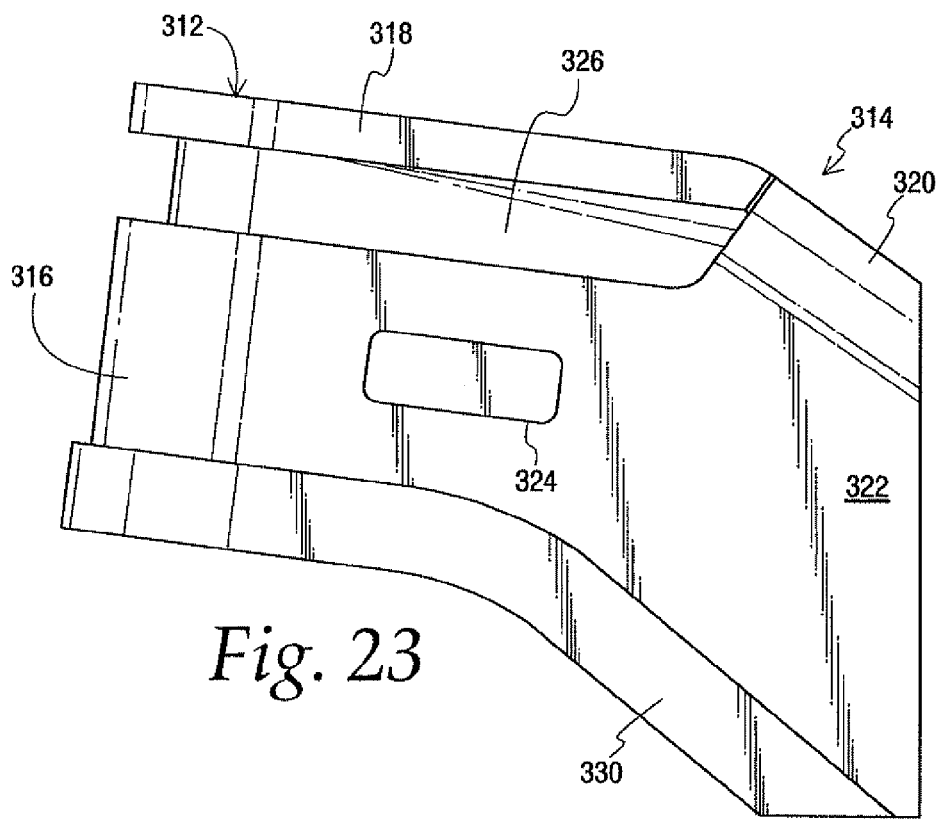
FIG. 23 is an elevational view of a portion of a vehicle axle according to an aspect of the present disclosure.
Figure 24:
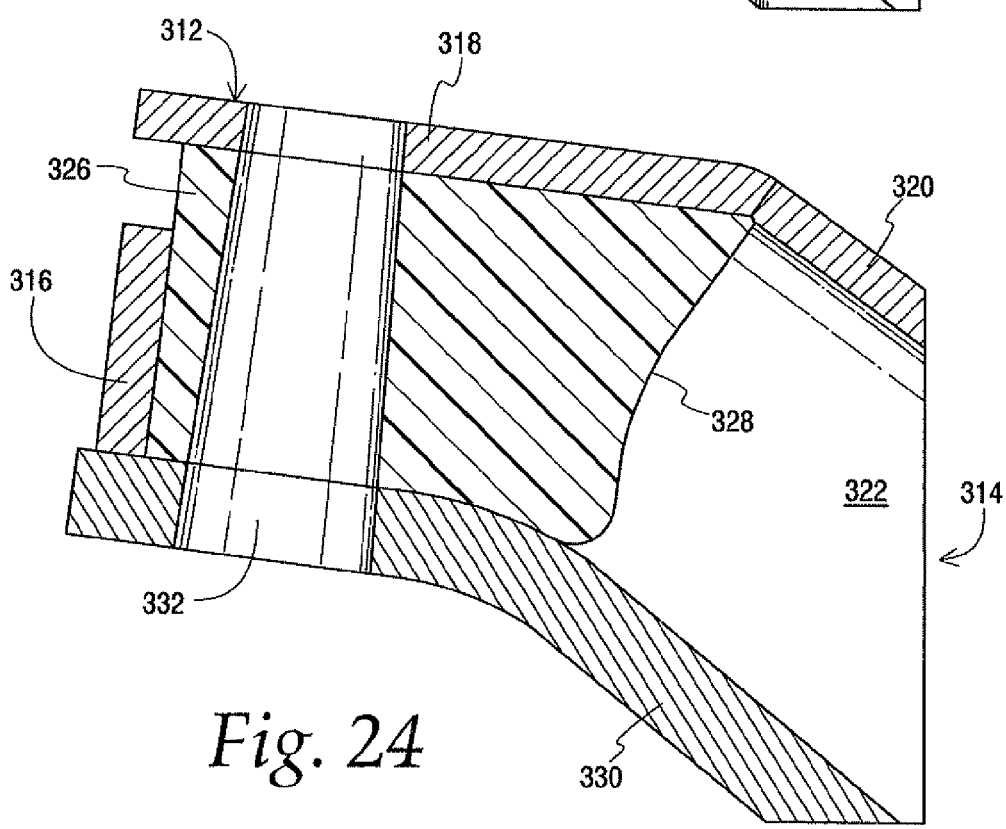
FIG. 24 is a cross-sectional view of the vehicle axle shown in FIG. 23.

FIGS. 23 and 24 illustrate an end or head section 312 of a fabricated vehicle axle generally designated 314. In accordance with the foregoing description of axle 110 of FIG. 9, end section 312 is defined by end extensions, which are curled toward each other and joined together to form an end wrap 316, and a cover flap 318 which is an extension of top wall 320 of U- or C-shaped channel 322. Each end extension may include an opening or window 324 passing therethrough.

Axle 314 further includes a reinforcing insert 326 received within the hollow end section 312. Reinforcing insert 326 is a substantially solid piece of material (typically metal, such as steel) which generally occupies the cavity or void defined by end wrap 316 and cover flap 318. Reinforcing insert 326 may include machined or formed surfaces configured to seat generally flush against the inner surfaces of channel 322. This may be advantageous to ensure proper orientation and more secure affixation of reinforcing insert 326 within end section 312. One of the surfaces (identified as 328 in FIG. 24) of reinforcing insert 326 faces the interior of axle 314 and does not abut against any inner surface of channel 322, so it may be variously configured without departing from the scope of the present disclosure.

According to one method of manufacturing axle 314, a flat is subjected to the forming steps illustrated in FIGS. 12A-12D. With the flat so processed into an open-bottom channel 322, a reinforcing insert 326 is inserted into each end section 312 of channel 322 via the open bottom. Reinforcing inserts 326 are then secured in place within the associated end section 312, for example, by welding them to the associated end wrap 316 and cover flap 318. Window 324 (if provided) and the gap between end wrap 316 and cover flap 318 allow for access to reinforcing insert 326 through the wall of channel 322, which makes it easier to secure reinforcing insert 326 in place if it is secured by welding.

When reinforcing insert 326 has been secured to channel 322, bottom plate 330 may be secured to channel 322 to overlay the open bottom of channel 322. Bottom plate 330 may also be secured to reinforcing insert 326 to further secure reinforcing insert 326 in place. Thereafter, king pin hole 332 may be cut or formed in cover flap 318, reinforcing insert 326, and bottom plate 330 for receiving a king pin. Alternatively, each of cover flap 318, reinforcing insert 326, and bottom plate 330 may be provided with a pre-formed king pin hole prior to their being joined, but it may be advantageous to form king pin hole 332 after joinder to ensure proper alignment. Regardless of when king pin hole 332 is formed, it may be either substantially cylindrical or, as shown in FIG. 24, substantially frusto-conical, which may be advantageous in that it allows the associated king pin to be selectively removed.

Figure 25:
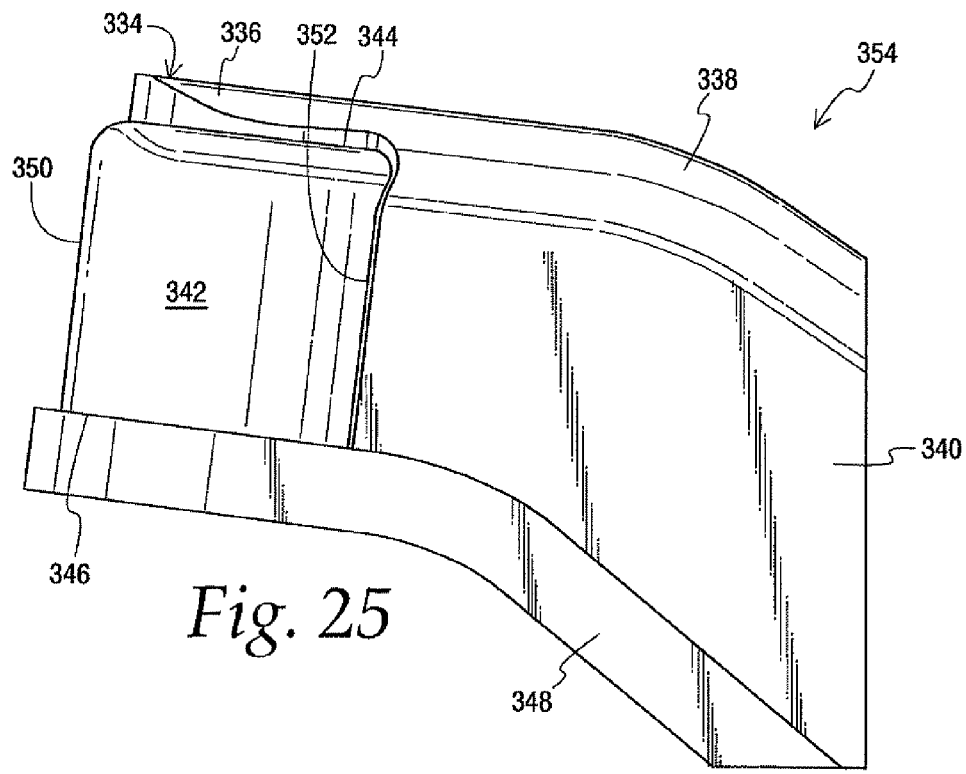
FIG. 25 is an elevational view of a portion of a vehicle axle according to another aspect of the present disclosure.
Figure 26:
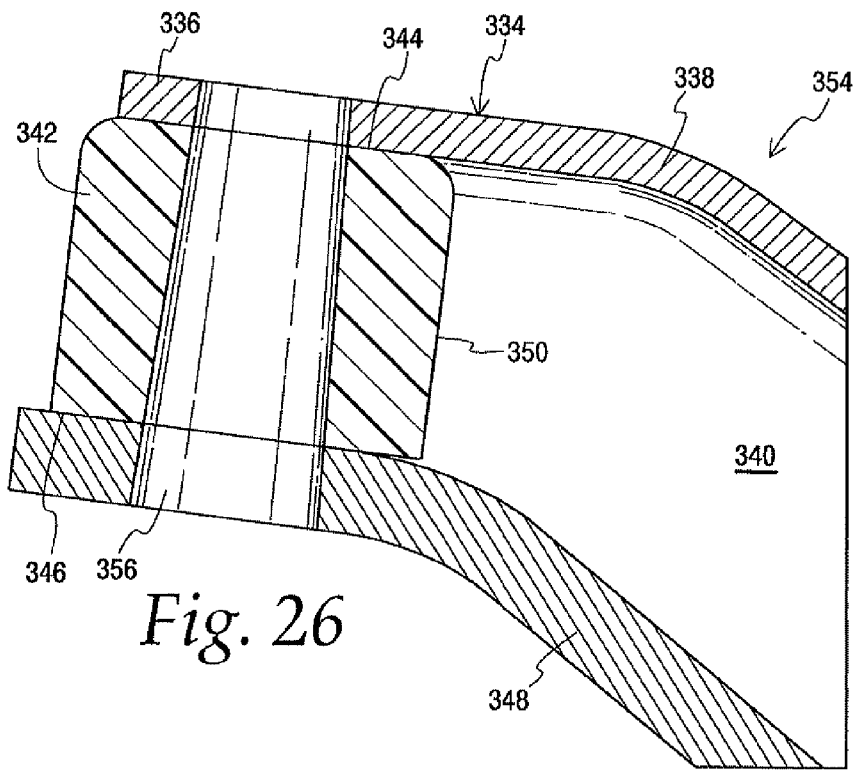
FIG. 26 is a cross-sectional view of the vehicle axle shown in FIG. 25.

FIGS. 25-27 illustrate another embodiment of an axle end section having a reinforcing insert. End section 334 includes a cover flap 336, which is an extension of top wall 338 of U- or C-shaped channel 340, but omits an end wrap. Accordingly, rather than defining a void or cavity, end section 334 defines an open slot in which a reinforcing insert 342 is received.

Reinforcing insert 342 is generally cylindrical, with a top surface 344 configured to seat generally flush against the underside of cover flap 336 and a bottom surface 346 configured to seat generally flush against bottom plate 348. The curved sidewall 350 of reinforcing insert 342 may be configured to bear against front and rear walls 352 of channel 340 when axle 354 has been assembled. It should be understood that the reinforcing insert illustrated in FIGS. 25-27 is merely exemplary and differently shaped reinforcing inserts may also be employed without departing from the scope of the present disclosure.

According to one method of manufacturing axle 354, channel 340 is formed with open ends, an open bottom, and inverted gull-wing type shapes at its ends which define end sections 334. With channel 340 so formed, a reinforcing insert 342 is inserted into each end section 334 of channel 340 via the open bottom or an open end. Reinforcing inserts 342 are then secured in place within the associated end section 334, for example, by welding them to the associated cover flap 336 and front and rear walls 352 of channel 340.

When reinforcing insert 342 has been secured to channel 340, bottom plate 348 may be secured to channel 340 to overlay the open bottom of channel 340. Bottom plate 348 may also be secured to reinforcing insert 342 to further secure reinforcing insert 342 in place. Alternatively, bottom plate 348 may be secured to channel 340 prior to introducing reinforcing insert 342, although introducing reinforcing insert 342 first may be advantageous to avoid various sizing and/or interfacing complications. As best shown in FIG. 27, reinforcing insert 342 may be larger than cover flap 336, but smaller than bottom plate 348 (when viewed from above), which provides sufficient space for welding the different pieces to each other.

When channel 340, reinforcing insert 342, and bottom plate 348 have been secured to each other, king pin hole 356 may be cut or formed in cover flap 336, reinforcing insert 342, and bottom plate 348 for receiving a king pin. Alternatively, each of cover flap 336, reinforcing insert 342, and bottom plate 348 may be provided with a pre-formed king pin hole prior to their being joined, but it may be advantageous to form king pin hole 356 after joinder to ensure proper alignment. King pin hole 356 may be either substantially cylindrical or, as shown in FIG. 26, substantially frusto-conical, which may be advantageous in that it allows the associated king pin to be selectively removed.

While this invention has been described with reference to certain illustrative aspects, it will be understood that this description shall not be construed in a limiting sense. Rather, various changes and modifications can be made to the illustrative embodiments without departing from the true spirit and scope of the invention.

The invention claimed is:
1. A fabricated vehicle axle, comprising:
a main beam formed by a channel and a bottom plate secured to the channel, the main beam forming a first axle head section, a first axle gooseneck section adjacent to said first axle head section, an axle midsection adjacent to said first axle gooseneck section, a second axle gooseneck section adjacent to said axle midsection, and a second axle head section adjacent to said second axle gooseneck section;
said channel having an inverted U-shaped configuration along its midsection defining a channel front wall, a channel rear wall and a channel top wall;
said channel extending from said first axle head section to said second axle head section;
a first extension extending from said front wall of said channel positioned at said first axle head section, and a second extension extending from said rear wall of said channel positioned at said first axle head section, the first and second extensions wrapping around and joining together at said first axle head section in order to close off the end of the axle at said first axle head section;
a third extension extending from said front wall of said channel positioned at said second axle head section, and a fourth extension extending from said rear wall of said channel positioned at said second axle head section, the third and fourth extensions wrapping around and joining together at said second axle head section in order to close off the end of the axle at said second axle head section;
a first head plate secured to said channel at said first axle head section; and
a second head plate secured to said channel at said second axle head section.

2. The fabricated vehicle axle of claim 1, wherein said first and second extensions are joined at the end of the axle at said first axle head section.

3. The fabricated vehicle axle of claim 1, wherein a vertical weld seam joins the first and second extensions.

4. The fabricated vehicle axle of claim 2, wherein said third and fourth extensions are joined at the end of the axle at said second axle head section.

5. The fabricated vehicle axle of claim 3, wherein another vertical weld seam joins the third and fourth extensions.

6. The fabricated vehicle axle of claim 1, wherein said first head plate has a king pin hole extending through it.

7. The fabricated vehicle axle of claim 6, wherein said second head plate has a king pin hole extending through it.

8. The fabricated vehicle axle of claim 1, wherein the end of said bottom plate positioned at said first axle head section has a king pin hole extending through it.

9. The fabricated vehicle axle of claim 8, wherein the end of said bottom plate positioned at said second axle head section has a king pin hole extending through it.

10. A fabricated vehicle axle, comprising:
a main beam formed by a channel and a bottom plate secured to the channel, the main beam forming a first axle head section, a first axle gooseneck section adjacent to said first axle head section, an axle midsection adjacent to said first axle gooseneck section, a second axle gooseneck section adjacent to said axle midsection, and a second axle head section adjacent to said second axle gooseneck section;
said channel having an inverted U-shaped configuration along its midsection defining a channel front wall, a channel rear wall and a channel top wall;
said channel extending from said first axle head section to said second axle head section;
a first extension extending from said front wall of said channel positioned at said first axle head section, and a second extension extending from said rear wall of said channel positioned at said first axle head section, the first and second extensions wrapping around and joining together at said first axle head section in order to close off the end of the axle at said first axle head section;
a first cover flap extension extending from said top wall of said channel positioned at said first axle head section, the first cover flap extension serving as a cover flap for said first axle head section, said first cover flap extension being spaced apart from upper edges of the first and second extensions;
a third extension extending from said front wall of said channel positioned at said second axle head section, and a fourth extension extending from said rear wall of said channel positioned at said second axle head section, the third and fourth extensions wrapping around and joining together at said second axle head section in order to close off the end of the axle at said second axle head section;
a second cover flap extension extending from said top wall of said channel positioned at said second axle head section, the second cover flap extension serving as a cover flap for said first axle head section and being spaced apart from upper edges of the third and fourth extensions;
a first head plate inserted into a first space between said first cover flap extension and said first and second extensions; and
a second head plate inserted into a second space between said second cover flap extension and said third and fourth extensions.

11. The fabricated vehicle axle of claim 10, wherein said first cover flap extension extends generally parallel to said upper edges of said first and second extensions, and said second cover flap extension extends generally parallel to said upper edges of said third and fourth extensions.

12. The fabricated vehicle axle of claim 10, wherein said first and second extensions are joined at the end of the axle at said first axle head section.

13. The fabricated vehicle axle of claim 10, wherein a vertical weld seam joins the first and second extensions.

14. The fabricated vehicle axle of claim 12, wherein said third and fourth extensions are joined at the end of the axle at said second axle head section.

15. The fabricated vehicle axle of claim 13, wherein another vertical weld seam joins the third and fourth extensions.

16. The fabricated vehicle axle of claim 10, wherein said first head plate has a king pin hole extending through it.

17. The fabricated vehicle axle of claim 16, wherein said second head plate has a king pin hole extending through it.

18. The fabricated vehicle axle of claim 10, wherein the end of said bottom plate positioned at said first axle head section has a king pin hole extending through it.

19. The fabricated vehicle axle of claim 18, wherein the end of said bottom plate positioned at said second axle head section has a king pin hole extending through it.

20. The fabricated vehicle axle of claim 10, wherein said bottom plate includes a steering stop portion defined by an edge having a convex shape as it the edge extends from a first portion of a bottom plate head to a wider second portion of said bottom plate head.

21. The fabricated vehicle axle of claim 10, wherein said first head plate includes a side chamfer configured to accommodate a weld for securing said first head plate to said channel.

22. The fabricated vehicle axle of claim 1, wherein said front and rear walls of said channel each have an axle seat mounting hole aligned with each other, and said axle further comprises a torsion resistor and a retaining sleeve, said torsion resistor having an axially extending rounded surface and wings extending generally radially outwardly from opposite ends of the rounded surface, said retaining sleeve being press fit into said rounded surface of said torsion resistor, and said rounded surface of said torsion resistor and said retaining sleeve being axially aligned with said axle seat mounting holes of the channel front and rear walls.

23. The fabricated vehicle axle of claim 10, wherein said front and rear walls of said channel each have an axle seat mounting hole aligned with each other, and said axle further comprises a torsion resistor and a retaining sleeve, said torsion resistor having an axially extending rounded surface and wings extending generally radially outwardly from opposite ends of the rounded surface, said retaining sleeve being press fit into said rounded surface of said torsion resistor, and said rounded surface of said torsion resistor and said retaining sleeve being axially aligned with said axle seat mounting holes of the channel front and rear walls.

24. A fabricated vehicle axle, comprising:
a main beam formed by a channel and a bottom plate secured to the channel, the main beam forming a first axle head section, a first axle gooseneck section adjacent to said first axle head section, an axle midsection adjacent to said first axle gooseneck section, a second axle gooseneck section adjacent to said axle midsection, and a second axle head section adjacent to said second axle gooseneck section;

said channel having an inverted U-shaped configuration along its midsection defining a channel front wall, a channel rear wall and a channel top wall;

said channel extending from said first axle head section to said second axle head section;

a first cover flap extension extending from said top wall of said channel positioned at said first axle head section, the first cover flap extension serving as a cover flap for said first axle head section and being spaced apart from said bottom plate;

a second cover flap extension extending from said top wall of said channel positioned at said second axle head section, the second cover flap extension serving as a cover flap for said first axle head section and being spaced apart from said bottom plate;

a first reinforcing insert at least partially received within a first space between said first cover flap extension and said bottom plate; and a second reinforcing insert at least partially received within a second space between said second cover flap extension and said bottom plate.

25. The fabricated vehicle axle of claim 24, further comprising a first extension extending from said front wall of said channel positioned at said first axle head section;

a second extension extending from said rear wall of said channel positioned at said first axle head section;

a third extension extending from said front wall of said channel positioned at said second axle head section; and a fourth extension extending from said rear wall of said channel positioned at said second axle head section, wherein the first and second extensions wrap around and join together at said first axle head section in order to substantially enclose said first reinforcing insert within said first axle head section and the third and fourth extensions wrap around and join together at said second axle head section in order to substantially enclose said second reinforcing insert within said second axle head section.

26. The fabricated vehicle axle of claim 25, wherein at least one of said first, second, third, and fourth extensions defines a window through which at least a portion of the associated reinforcing insert is accessible.

27. The fabricated vehicle axle of claim 25, wherein said first cover flap extension is spaced apart from upper edges of the first and second extensions and at least a portion of said first reinforcing insert is accessible through the space therebetween, and said second cover flap extension is spaced apart from upper edges of the third and fourth extensions and at least a portion of said second reinforcing insert is accessible through the space therebetween.

28. The fabricated vehicle axle of claim 27, wherein each of said first, second, third, and fourth extensions defines a window therethrough.

29. The fabricated vehicle axle of claim 25, wherein selected surfaces of said first reinforcing insert are generally flush with inner surfaces of said first cover flap extension, said first and second extensions, and said bottom plate, and selected surfaces of said second reinforcing insert are generally flush with inner surfaces of said second cover flap extension, said third and fourth extensions, and said bottom plate.

30. The fabricated vehicle axle of claim 24, wherein said reinforcing inserts are generally cylindrical.

31. The fabricated vehicle axle of claim 24, wherein at least one of said reinforcing inserts extends laterally and longitudinally beyond a perimeter of the associated cover flap extension.

32. The fabricated vehicle axle of claim 24, wherein the reinforcing inserts bear against said channel front wall and said channel rear wall.

33. The fabricated vehicle axle of claim 32, wherein selected surfaces of said first reinforcing insert are generally flush with inner surfaces of said first cover flap extension and said bottom plate, and selected surfaces of said second reinforcing insert are generally flush with inner surfaces of said second cover flap extension and said bottom plate.

34. The fabricated vehicle axle of claim 24, wherein each of said reinforcing inserts has a king pin hole extending through it.

35. The fabricated vehicle axle of claim 34, wherein said king pin holes are substantially cylindrical.

36. The fabricated vehicle axle of claim 34, wherein said king pin holes are substantially frusto-conical.

* * * * *